United States Patent
Iimura et al.

(10) Patent No.: US 7,151,727 B2
(45) Date of Patent: Dec. 19, 2006

(54) DISC-SHAPED RECORDING MEDIUM, DISC-STATE RECORDING MEDIUM CUTTING APPARATUS, AND DISC DRIVE APPARATUS

(75) Inventors: Shinichiro Iimura, Tokyo (JP); Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 10/275,832

(22) PCT Filed: Mar. 7, 2002

(86) PCT No.: PCT/JP02/02150

§ 371 (c)(1),
(2), (4) Date: Apr. 14, 2003

(87) PCT Pub. No.: WO02/073607

PCT Pub. Date: Sep. 19, 2002

(65) Prior Publication Data

US 2003/0165095 A1    Sep. 4, 2003

(30) Foreign Application Priority Data

Mar. 12, 2001 (JP) ............................... 2001-68290
Apr. 20, 2001 (JP) ............................... 2001-122905

(51) Int. Cl.
*G11B 7/00* (2006.01)
(52) U.S. Cl. ................. 369/47.22; 369/47.28; 369/275.4
(58) Field of Classification Search ............. 369/47.22
See application file for complete search history.

(56) References Cited

U.S. PATENT DOCUMENTS

| 5,185,732 A | 2/1993 | Ogawa et al. ............... 369/47 |
| 5,210,738 A | 5/1993 | Iwata et al. ............. 369/275.1 |
| 5,754,522 A | 5/1998 | Kobayashi et al. ...... 369/275.3 |
| 5,825,733 A | 10/1998 | Ogawa |

(Continued)

FOREIGN PATENT DOCUMENTS

JP          59-10058          1/1984

(Continued)

OTHER PUBLICATIONS

Patent Abstracts of Japan, JP 2000-339688, A (Pioneer Electronic Corp).

*Primary Examiner*—Andrea Wellington
*Assistant Examiner*—Lixi Chow
(74) *Attorney, Agent, or Firm*—Oblon, Spivak, McClelland, Maier & Neustadt, P.C.

(57) ABSTRACT

There is provided an optical disc having preformed thereon a spiral wobbled track as a grove and/or land along with data is to be recorded. The track is wobbled for a series of predetermined signal units each composed of an FSK information bit part based on a waveform resulted from FSK modulation of information bit and a singe-frequency part based on a waveform of a single frequency. The FSK modulation uses two different frequencies of which the one is the same as the single frequency and the other is different from the single frequency. These different frequencies are in such a relation that each of them has an even number of wobbles and an odd number of wobbles alternately in a predetermined cycle.

28 Claims, 27 Drawing Sheets

| U.S. PATENT DOCUMENTS | | | | FOREIGN PATENT DOCUMENTS | | |
|---|---|---|---|---|---|---|
| 5,963,519 A | 10/1999 | Kim | | JP | 1-151082 | 6/1989 |
| 6,160,776 A | 12/2000 | Seo | | JP | 2-87344 | 3/1990 |
| 6,201,778 B1* | 3/2001 | Sensyu | 369/53.34 | JP | 4-47537 | 2/1992 |
| 6,310,851 B1* | 10/2001 | Tobita et al. | 369/111 | JP | 4-90169 | 3/1992 |
| 6,377,525 B1* | 4/2002 | Iida | 369/47.17 | JP | 8-256185 | 10/1996 |
| 6,377,537 B1 | 4/2002 | Maeda et al. | | JP | 9-212871 | 8/1997 |
| 6,853,615 B1 | 2/2005 | Spruit et al. | | JP | 2000-339688 | 12/2000 |
| 2001/0000698 A1* | 5/2001 | Aoki | 369/47.47 | JP | 2001-34952 | 2/2001 |
| 2003/0048725 A1* | 3/2003 | Lee et al. | 369/59.13 | JP | 2001-148722 | 5/2001 |
| 2003/0112725 A1 | 6/2003 | Kobayashi et al. | | WO | WO 01/01404 | 1/2001 |
| 2003/0165095 A1 | 9/2003 | Iimura et al. | | | | |
| 2003/0174603 A1 | 9/2003 | Schep et al. | | * cited by examiner | | |

DVD-R, DVD-RW

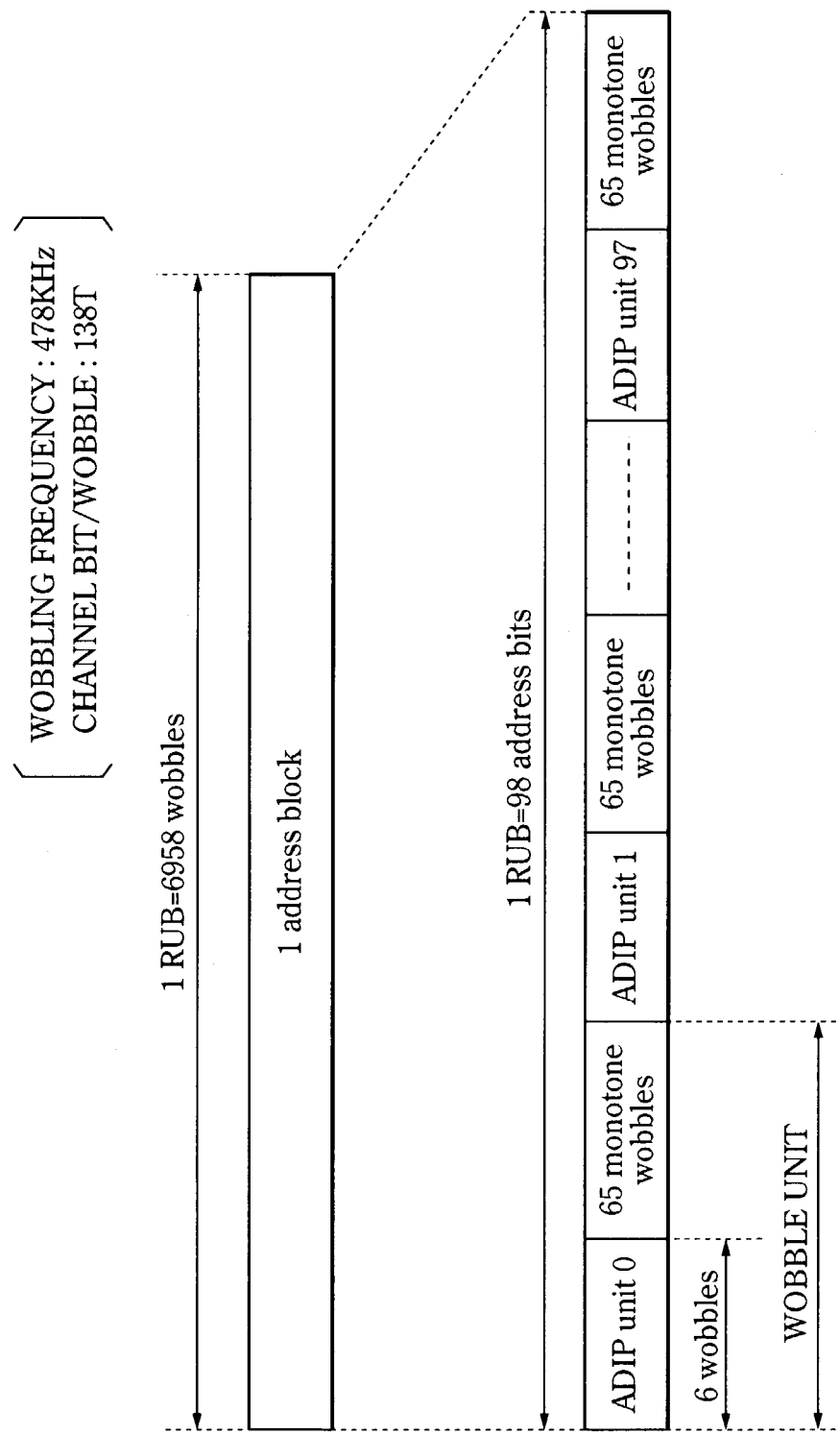

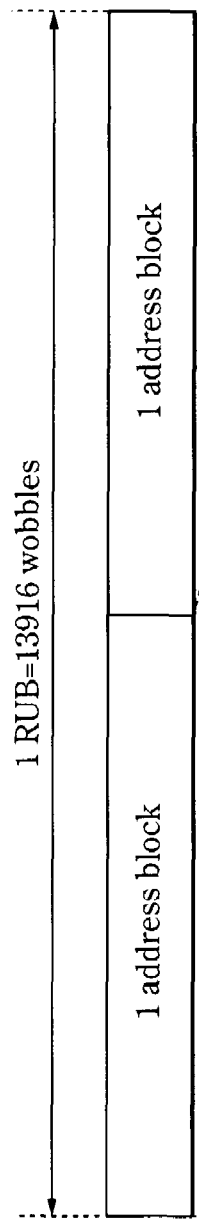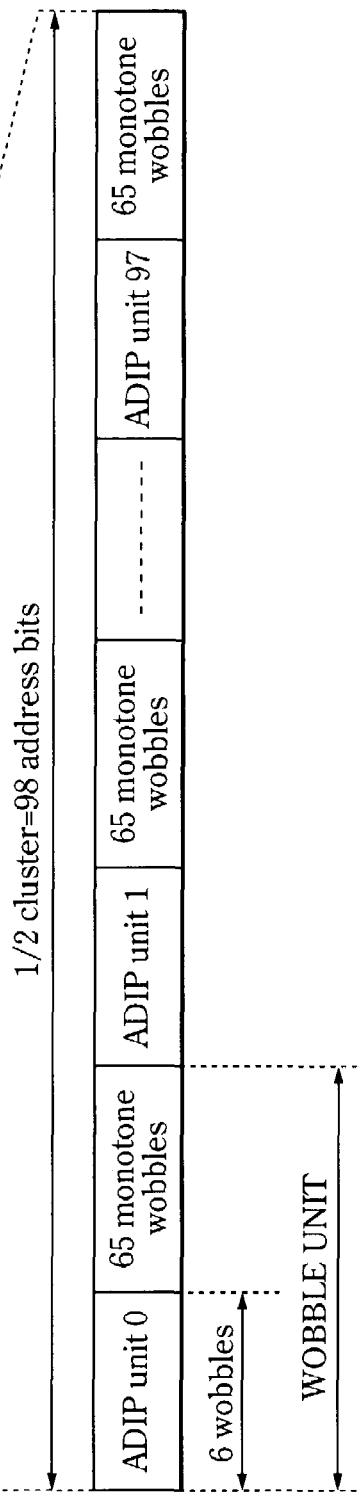
FIG.10A
FIG.10B

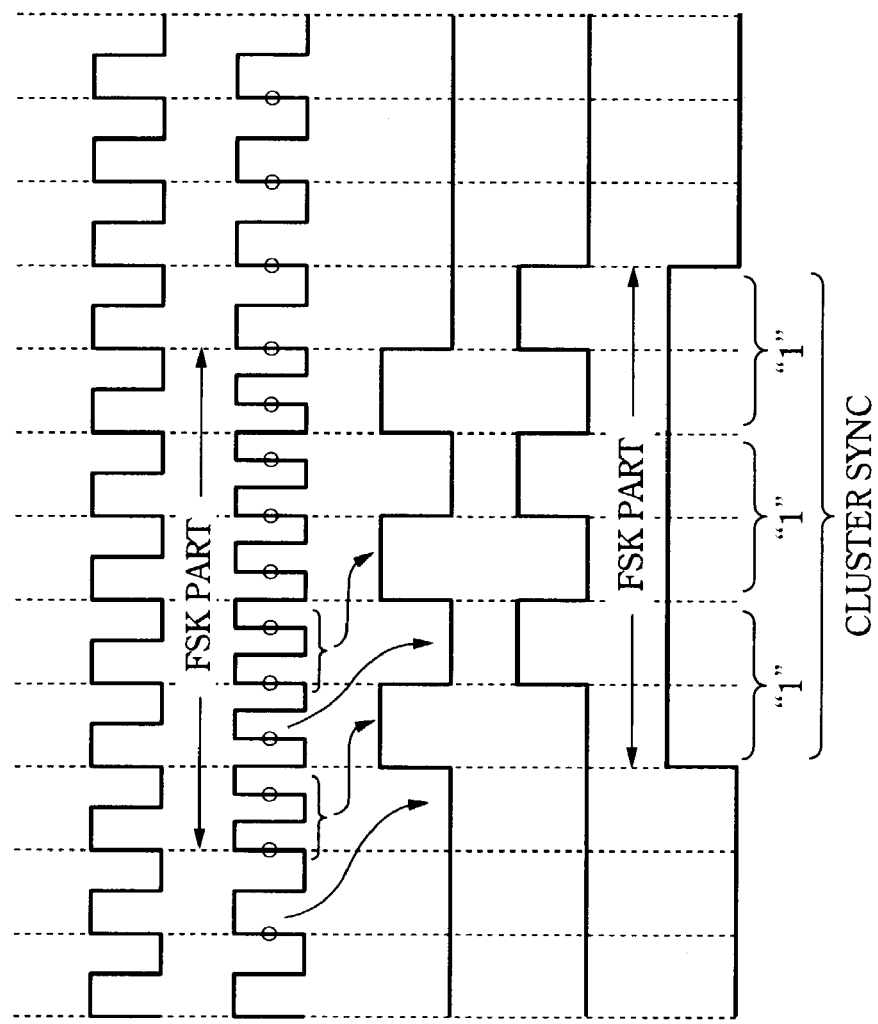
FIG.17A WOBBLING CLOCK WCK
FIG.17B INPUT PUSH-PULL SIGNAL (BINARIZED)
FIG.17C RISING EDGE COUNT
FIG.17D DELAY BY 1T
FIG.17E OR OUTPUT

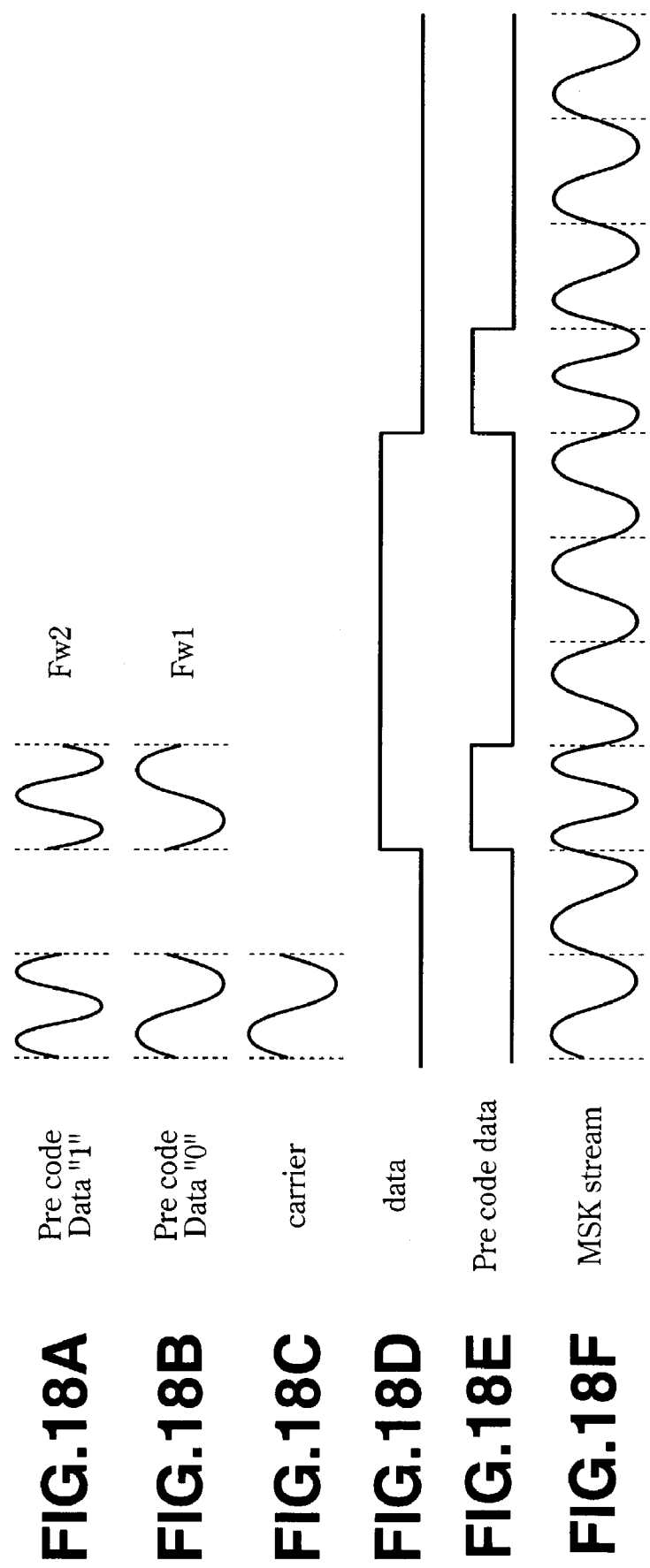

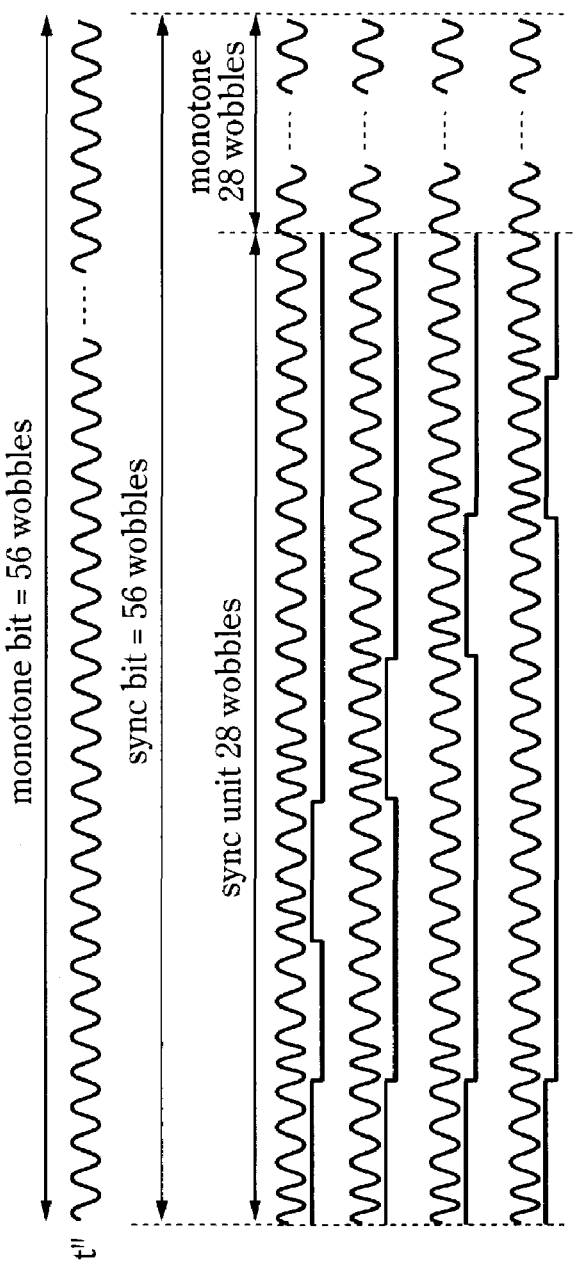

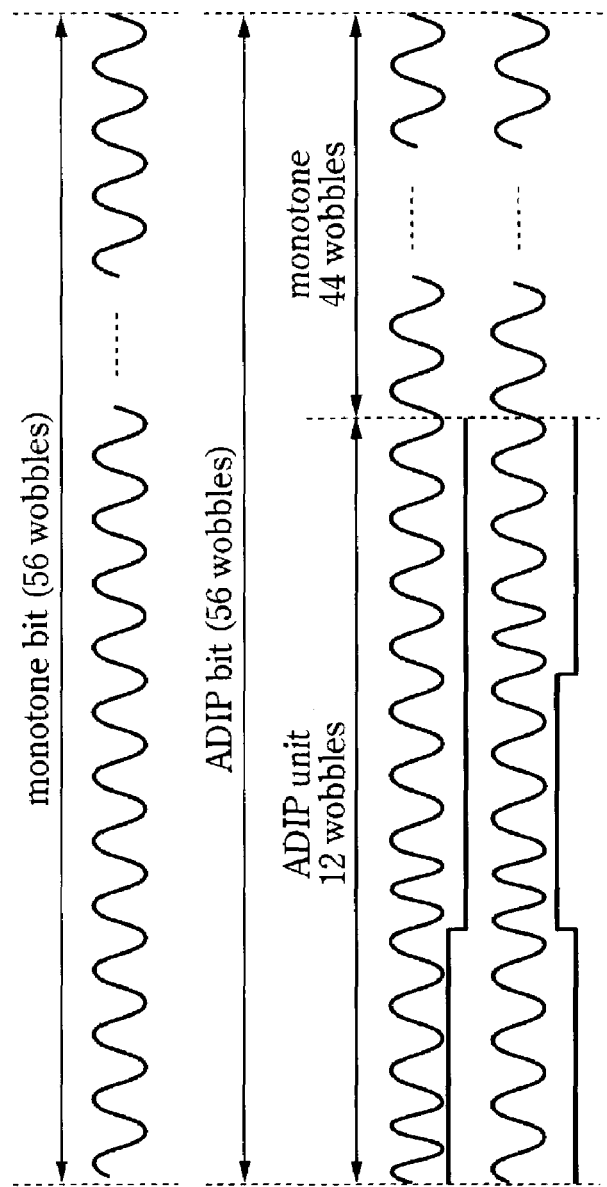

DISC-SHAPED RECORDING MEDIUM, DISC-STATE RECORDING MEDIUM CUTTING APPARATUS, AND DISC DRIVE APPARATUS

TECHNICAL FIELD

The present invention generally relates to a disc-shaped recording medium such as an optical disc, a cutting apparatus for use in production of the disc-shaped recording medium and a disc drive for recording and/or reproducing data to and/or from the disc-shaped recording medium, and more particularly to a disc-shaped recording medium having a wobbled track as a pregroove formed thereon.

BACKGROUND ART

To record data to an optical disc which is a disc-shaped recording medium, a guiding means is required for forming a recording track. To this end, pregrooves are preformed on the optical disc and the groove itself or a land, of which the cross section is trapezoidal, between the preformed grooves is used as the recording track.

Address information has to be recorded on an optical disc of this type to permit recording of data in a given position on a recording track on the optical disc. In some cases, such address information is recorded on the optical disc by wobbling a groove. Namely, a data recording track is preformed as a pregroove for example on the optical disc while the lateral wall of the pregroove is being wobbled correspondingly to the address information. Thus, for recording or reproducing data to or from the optical disc, an address to which the data is to be written or from which the data is to be read can be read from wobbling information provided as return light information, and the data can be written to a desired position or read from a desired position without having to preform pit data or the like indicating an address, for example, on the recording track.

By additionally recording address information as a wobbled groove, it will be unnecessary to discretely define an address area on a track and record an address as pit data in such address area, for example. Therefore, the actual capacity of the optical disc for recording data can be increased for the address area which is thus made unnecessary.

Absolute time (address) information represented by such a wobbled groove is called ATIP (absolute time in pregroove) or ADIP (address in pregroove).

Optical discs having such a wobbled groove formed thereon include CD-R (CD-Recordable), CD-RW (CD-Rewritable), DVD-R, CD-RW, DVD+RW, etc. In these types of optical discs, however, address information is additionally recorded as a wobbled groove in a manner different from one type to another of these optical discs.

In CD-R and CD-RW, the groove is wobbled according to a signal generated by making FM modulation of address information.

ATIP information embedded in a wobbled groove formed on CD-R/CD-RW is subjected to biphase modulation before the FM modulation as shown in FIG. 1. More specifically, the biphase modulation is such that ATIP data such as an address or the like is changed in state between "1" and "0" in each predetermined cycle by the biphase modulation and its ratio between average numbers of "1" and "0" is 1:1, and a wobbling signal of 22.05 kHz in average frequency are generated by the FM modulation of the ATIP data. A groove defining a recording track is wobbled according to such an FM modulation signal.

In DVD-RW which is a phase-change recording-based rewritable version of DVD (digital versatile disc) and DVD-R which is an organic dye change-based recordable version of DVD, wobbled grooves G are formed as preformatted on the disc and a land prepit LPP is formed in a land between the grooves G, as shown in FIG. 2.

In this case, the wobbled groove is used to control the rotation of the disc and generate a recording master clock or for similar purposes, and the land prepit is used to determine an accurate recording position in bits and acquire a variety of information about the disc such as a pre-address etc. In this case, the pieces of address information themselves are recorded as land prepits LPP, not as wobbles of the groove.

In DVD-RAM which is the phase change recordable version of DVD, information such as an address is recorded as a groove wobbled based on the phase modulation (PSK modulation) on the disc.

FIGS. 3A to 3C show information represented by phase modulation-based wobbles of the groove. As shown in FIGS. 3A to 3C, eight wobbles are taken as one ADIP unit. Each of the wobbles is phase-modulated for a positive wobble PW and negative wobble NW to take place alternately in a predetermined order, so that the ADIP unit represents a sync pattern or data "0" or "1".

Note that the positive wobble PW is a wobble whose leading end is directed toward the inner circumference of the disc, and the negative wobble NW is a wobble whose leading end is directed toward the outer-circumference of the disc.

FIG. 3A shows a sync pattern (ADIP sync unit). In this sync pattern, the former four wobbles (W0 to W3) are negative ones NW and the latter four wobbles (W4 to W7) are positive ones PW.

FIG. 3B shows an ADIP data unit being the data "0". In this ADIP data unit, the leading wobble W0 is a negative one NW as a bit sync, it is followed by three wobbles W1 to W3 as positive ones PW, and the latter four wobbles include two wobbles W4 and W5 as positive wobbles PW and two wobbles W6 and W7 as negative ones NW. Thus, the ADIP data unit represents data "0".

FIG. 3C shows an ADIP data unit being the data "1". In this ADIP data unit, the leading wobble W0 is a negative one NW as a bit sync, it is followed by three wobbles W1 to W3 as positive ones PW, and the latter four wobbles include two wobbles W6 and W7 as negative ones NW and two wobbles W6 and W7 as positive ones PW. Thus, the ADIP data unit represents data "1".

These ADIP units represent together one channel bit, and a predetermined number of such ADIP units represents an address or the like.

However, the above wobbling techniques are not advantageous as follows:

First, in case a groove is wobbled according to FM modulation data as in CD-R and CD-RW, the stroke of a wobble of an adjacent track will cause a phase change of the FM waveform. Thus, in case the track pitch is reduced, an address as ATIP data cannot be reproduced well. In other words, the FM modulation data-based wobbling cannot suitably be used in case the track pitch is narrowed for an improved recording density.

Next, in case land prepits are formed as in DVD-R and DVD-RW, the land prepits may possibly have a cross talk into a read RF signal, causing a data error and mastering (cutting) has to be done for the groove and land prepits (2-beam mastering). This is relatively difficult to implement.

Further, in case a groove is wobbled according to PSK data as in DVD-RW, the RF component at the phase-change point of a PSK modulation wave may possibly have a crosstalk into a read RF signal, causing a critical error.

Also, since the PSK phase shift point has an extremely high frequency component, the essential frequency band of a wobbling signal processing circuit system will be higher.

DISCLOSURE OF THE INVENTION

Accordingly, the present invention has an object to overcome the above-mentioned drawbacks of the related art by providing a novel and improved disc-shaped recording medium in which a groove is wobbled by a wobbling method suitable for an increased recording capacity and improved write-read characteristics of the recording medium, a cutting apparatus for production of the disc-shaped recording medium, and a disc drive compatible with the disc-shaped recording medium.

The above object can be attained by providing a disc-shaped recording medium having preformed thereon a spiral, wobbled track as a groove or land along which data is recorded, wherein the wobble of the track is a series of predetermined signal units each consisting of an FSK information bit part corresponding to a waveform resulted from FSK (frequency shift keying) modulation of information bit and a single-frequency part corresponding to the waveform of a single frequency.

For the above disc-shaped recording medium, two different frequencies are used in the FSK modulation. One of the frequencies is the same as the single frequency while the other frequency is different from the single frequency. These frequencies are in such a relation that each of them has an even number of waves and an odd number of waves alternately in a predetermined cycle. For example, the other frequency has a frequency 1.5 times or 1/1.5 times higher than that of the one frequency.

In the FSK information bit part, a 2-wave period of a frequency as the single frequency corresponds to one channel bit as information bit.

The period length of the FSK information bit part is an integral multiple of the period of the single frequency. In the predetermined unit, the period length of the single-frequency part is more than about 10 times of that of the FSK information bit part.

According to the present invention, the integral multiple of the predetermined units corresponds to a time length in a recording unit of data to be recorded to the track.

The channel clock frequency of the data to be recorded to the track is an integral multiple of the single frequency. The frequency as the single frequency is a one between a tracking servo frequency band and read signal frequency band.

The FSK information bit part is formed on the basis of a waveform resulted from FSK modulation of information bit as address information. The FSK modulation for the FSK information bit part uses two different frequencies. One of these frequencies is continuous in phase with the other at the point of shift from one to the other.

According to the present invention, the FSK modulation is an MSK (minimum shift keying) modulation. In the FSK information bit part resulted from MSK modulation of the information bit, a 4-wave period of the frequency as the single frequency corresponds to one channel bit as information bit. In this case, the FSK information bit part resulted from MSK modulation of the information bit includes two different frequencies of which the one is the same as the single frequency and the other is a frequency x times higher than the single frequency. The 4-wave period includes a period of four waves of the one frequency and a period of x waves of the other frequency and three waves of the one frequency. For example, x=1.5.

Also, the above object can be attained by providing a cutting apparatus including according to the present invention:

means for generating a series of predetermined signal units each composed of a signal part resulted from FSK modulation of information bit and a signal part of a single frequency;

means for generating a drive signal on the basis of the signal supplied from the signal generating means;

a laser source means;

means for deflecting laser light from the laser source means on the basis of the drive signal from the drive signal generating means; and means for cutting a disc substrate by radiating the laser light to the disc substrate through the laser light deflecting means to form, on the disc substrate, a wobbled track including a series of predetermined units each composed of an FSK information bit part based on a waveform resulted from FSK modulation of the information bit and a single-frequency part based on the waveform of the single frequency.

Also, the above object can be attained by providing a disc drive for recording or reproducing data to or from the aforementioned disc-shaped recording medium according to the present invention, the apparatus including according to the present invention:

a head means for radiating laser light to a track to generate a return light signal;

means for extracting a wobbling signal about wobbling of the track from the return light signal; and a wobbling information decoding means for making FSK demodulation of the wobbling signal to decode information represented by the information bit.

More specifically, the wobbling information decoding means includes a clock reproduction unit to generate, by a PLL, a wobble reproduction clock on the basis of a signal corresponding to a single-frequency part of the wobbling signal, an FSK demodulator to make FSK demodulation of the wobbling signal corresponding to an FSK information bit part of the wobbling signal to provide demodulation data, and a decoder to decode required information composed of the information bit from the demodulation data supplied from the FSK demodulator.

The FSK demodulator includes a correlation detection circuit to make FSK demodulation by detecting a correlation between the wobbling signal and a delay signal resulted from delaying of the wobbling signal by a period of the wobble reproduction clock.

The FSK demodulator includes also a frequency detection circuit to make FSK demodulation by detecting a number of rising edges or falling edges of the wobbling signal, existent within one period of the wobble reproduction clock.

In case the FSK demodulator includes the above correlation detection circuit and frequency detection circuit, the decoder decodes the required information using both the demodulation data demodulated by the correlation detection circuit and that demodulated by the frequency detection circuit. Particularly, the decoder decodes the required information from a logical product of the demodulated data from the correlation detection circuit and that from the frequency detection circuit when the PLL is being pulled in the clock reproduction unit, and it decodes the required information from a logical sum f the demodulated data from the correlation detection circuit and that from the frequency detection circuit when the PLL is stable in the clock reproduction unit.

The decoder includes a gate generator to generate a gate signal for the PLL in the clock reproduction unit based on the fact that it decodes sync information as one of the required information, and the PLL functions on the basis of the gate signal to provide a PLL operation based solely on a part, corresponding to the single frequency, of the wobbling signal.

The disc drive according to the present invention further includes a spindle servo means for making spindle servo control using the wobble reproduction clock, and means for generating an encode clock synchronous with the wobble reproduction clock and which is to be used for encoding data to be recorded.

The wobbling information decoder also includes an MSK demodulator for making MSK modulation of an MSK modulation signal corresponding to the FSK information bit part of the wobbling signal to generate demodulation data. The MSK demodulator demodulates the MSK modulation signal in units of the 4-wave period of the frequency as the single frequency to provide the modulation signal.

The wobbling method adopted in the present invention is such that a wobbled track is formed as a series of predetermined units each including an FSK information bit part and a single-frequency part based on the waveform of a single frequency. That is, since the FSK (MSK) is partial, the wobbling is little influenced by any crosstalk. Also, since the land such as the land prepits has no missing part, there will not take place any influence of any land missing-part on data to be recorded. Since no pits are formed in the land, mastering can be made with a single beam. Further, the wobbling has no high frequency component as in the PSK.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 9A and 9B explain an address structure on the optical disc according to the present invention.

FIGS. 10A and 10B explain an address structure on the optical disc according to the present invention.

FIGS. 17A to 17E show waveforms indicating points of time at which the frequency detection circuit is actuated.

FIGS. 18A to 18F explain an MSK stream of wobbles on a second embodiment of the optical disc according to the present invention.

FIGS. 21A to 21C explain a sync signal part on the second embodiment of the optical disc according to the present invention.

FIGS. 22A to 22E explain a sync bit pattern on the second embodiment of the optical disc according to the present invention.

FIGS. 24A to 24C explains an ADIP bit pattern on the second embodiment of the optical disc according to the present invention.

BEST MODE FOR CARRYING OUT THE INVENTION

The present invention will be described herebelow concerning its applications to an optical disc, a cutting apparatus for use in producing the optical disc, and a disc drive for recording and reproducing data to and from the optical disc.

The description of the present invention will be given in the following order:

First Embodiment:
1-1 Physical characteristics of the optical disc
1-2 Wobbling method
1-3 Cutting apparatus
1-4 Disc drive
Second Embodiment:
2-1 Wobbling method
2-2 Demodulation
First Embodiment:
1-1 Physical Characteristics of the Optical Disc The physical characteristics of the optical disc according to the present invention and a wobbled track formed on the optical disc will be described below:

The optical disc according to the present invention is included in the category of discs called "DVR (data and video recording)" for example. It adopts a novel wobbling method dedicated for DVR.

Table 1 shows the typical parameters of the first embodiment of the optical disc according to the present invention.

TABLE 1

| | |
|---|---|
| Laser wavelength | 405 nm |
| Numerical aperture (NA) | 0.85 |
| Disc diameter | 120 mm |
| Disc thickness | 1.2 mm |
| Diametrical position of information area | 44 to 117 mm |
| Track pitch | 0.30 μm |
| Channel bit length | 0.086 μm |
| Data bit length | 0.13 μm |
| Capacity for user data | 22.46 Gbytes |
| Average rate of user data transfer | 35 Mbits/sec |
| Recording method | Phase-change/in-groove recording |

The first embodiment of the optical disc according to the present invention is a one using the phase-change recording method for recording data thereto. The disc has a diameter of 120 mm and a thickness of 1.2 mm. These diameter and thickness of the optical disc according to the present invention are similar to those of CD (compact disc) and DVD (digital versatile disc).

Like the conventional similar types of discs, the first embodiment of the optical disc has defined thereon a lead-in area, program area and a lead-out area, counted from the inner circumference thereof. The information area including these areas diametrically covers an area ranging from 44 mm to 117 mm.

The wavelength of the laser light used for recording or reproducing data is 405 nm. According to the present invention, the laser light is a so-called blue laser. To focus the laser light radiated to the optical disc on the signal recording layer of the optical disc, there Is used an objective lens having a numerical aperture (NA) of 0.85.

The track pitch of the recording track is 0.30 μm, channel bit length is 0.086 μm, and the data bit length is 0.13 μm. The optical disc has a capacity of 22.46 Gbytes for recording user data. User data can be transferred at an average rate of 35 Mbits per second.

Data is recorded by the groove recording method. Namely, a groove is already formed as a recording track on the optical disc, and data is recorded in the groove.

Figure 1:
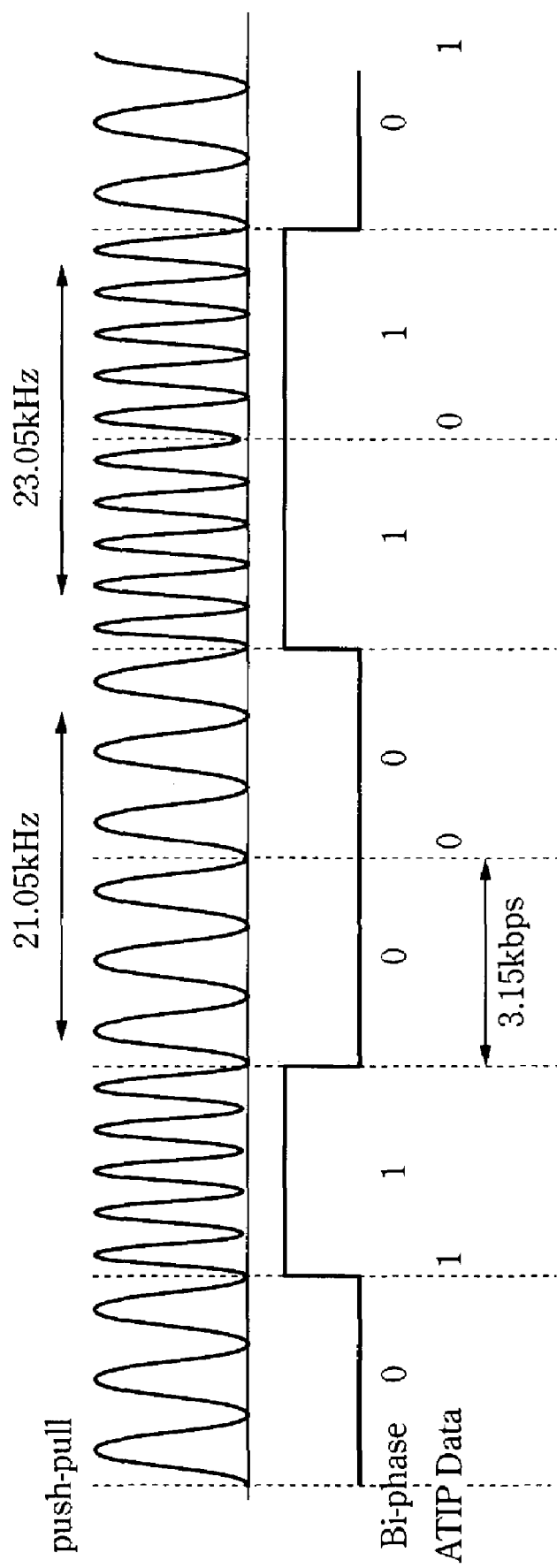
FIG. 1 explains an FM modulation-based wobbling.
Figure 2:
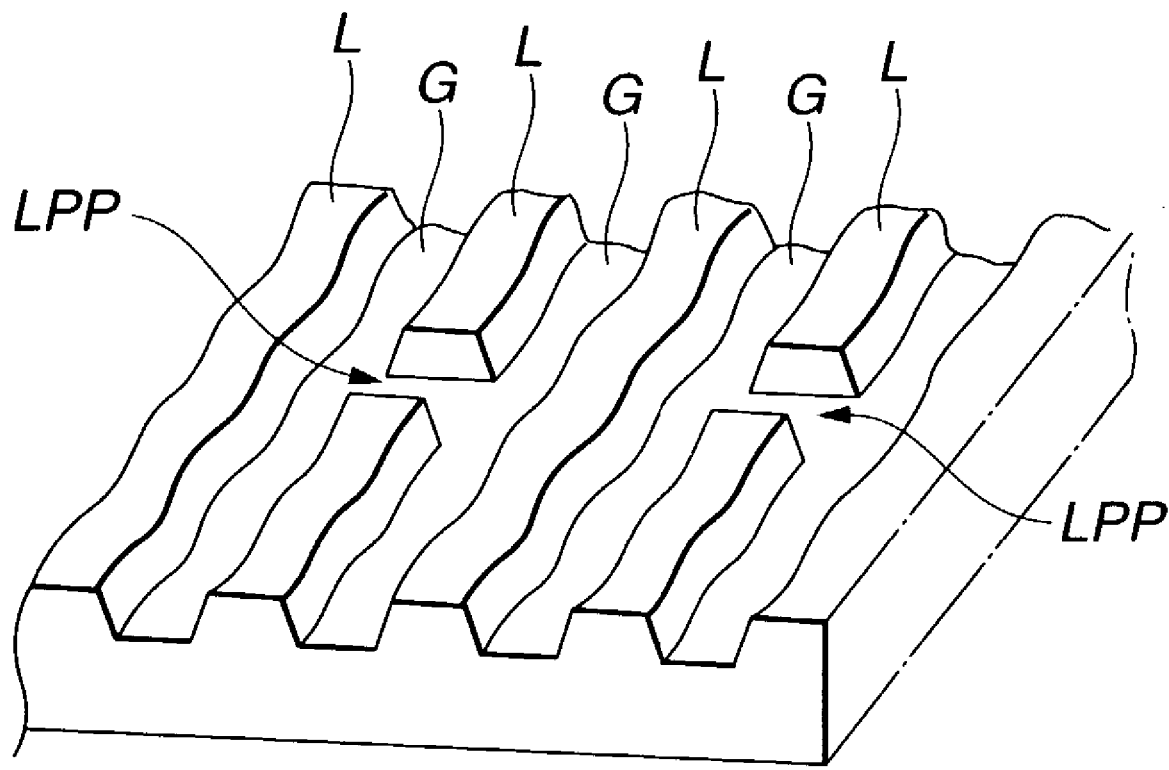
FIG. 2 explains forming of land prepits.
Figure 3A:
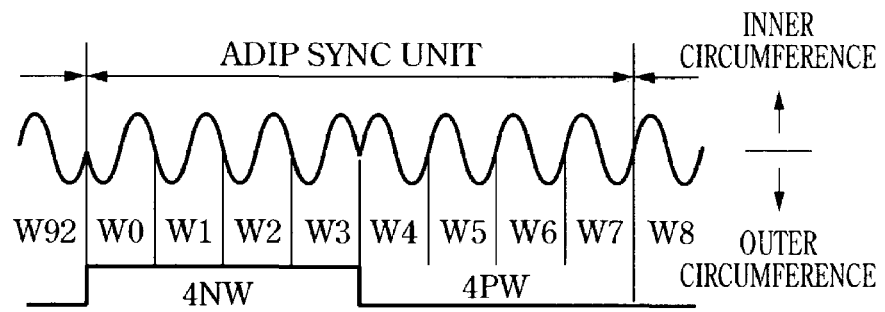
FIGS. 3A, 3B and 3C show information represented by phase-modulated wobbles of a groove.
Figure 3B:
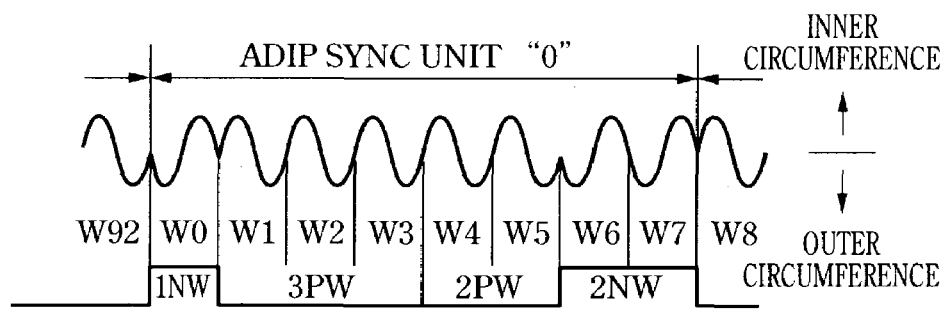
Figure 3C:
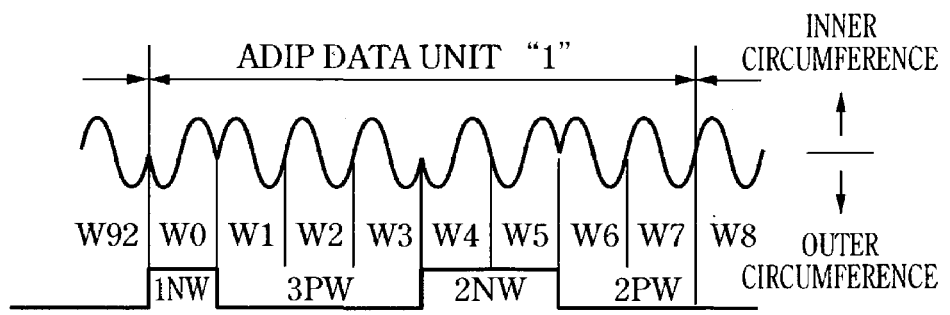
Figure 4A:
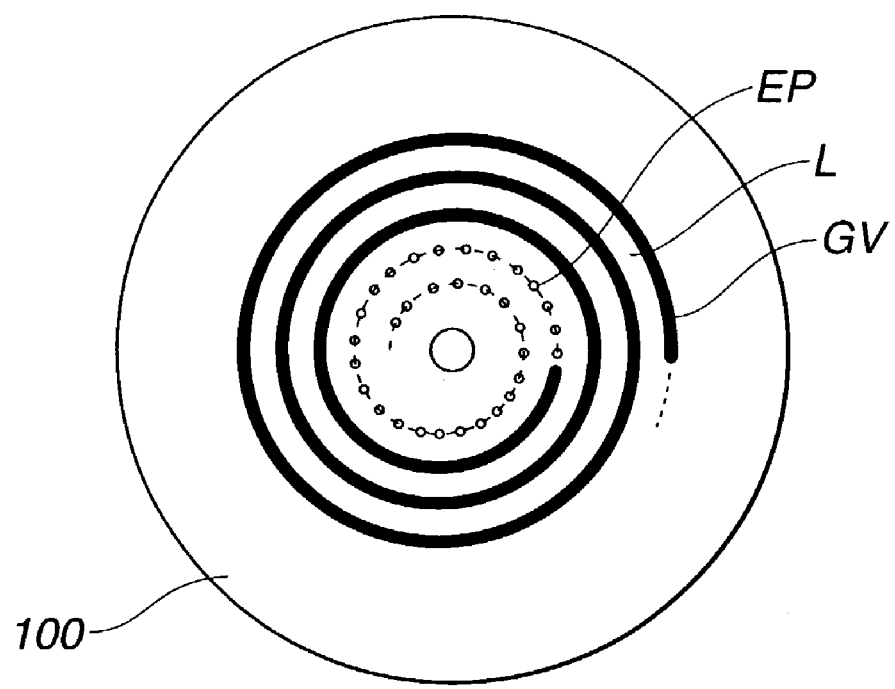
FIG. 4A is a plan view of a first embodiment of the optical disc according to the present invention, having a wobbled groove formed thereon.

FIG. 4A illustrates, in the form of a plan view, a first embodiment of the optical disc according to the present invention. The optical disc is indicated with a reference 100. In this optical disc 100, embossed pits EP are preformatted at the innermost circumference side and a groove GV is formed in a range from next to the embossed pits EP to the outer circumference side, as shown. The groove GV is formed spirally from the inner circumference toward the outer circumference of the optical disc. It should be noted that the groove GV may be formed concentrically as another embodiment. Wobbles of such a groove GV represent physical addresses.

Figure 4B:
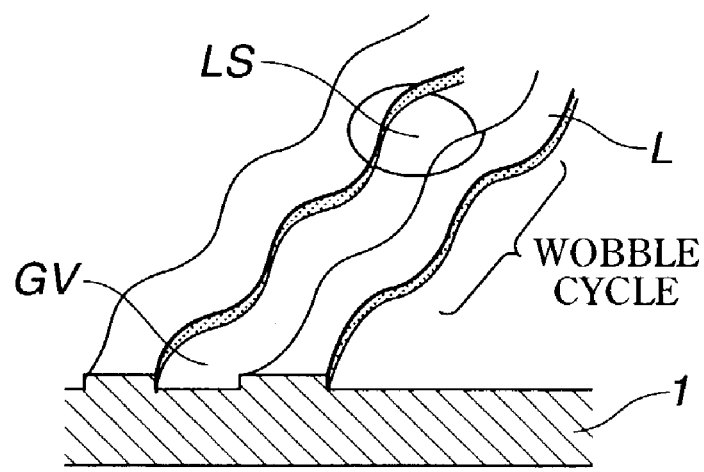
FIG. 4B is a partial perspective view of the optical disc.

FIG. 4B is a schematic partial perspective view of an optical disc. The optical disc is indicated with a reference 1. As shown, the optical disc 1 has a groove GV formed thereon. The lateral wall of the groove GV are wobbled adaptively to address information or the like, that is, correspondingly to a signal generated based on an address or the like. A land L lies between two adjacent grooves GV. Data is recorded in the groove GV as mentioned above. That is, the groove GV serves as a recording track. It should be noted that alternatively, data may be recorded on the land L as a recording track or in the groove GV and on the land L.

The present invention provides an optical disc featured by a wobbling of the groove, which will be described in detail later. Briefly, with the groove wobbled adaptively to a signal generated by FSK modulation of an address or the like, the optical disc according to the present invention is suitably usable as a high-density, large-capacity disc.

Note that data is written or read to or from the optical disc 100 being rotated at a CLV (constant linear velocity). The CLV rotation is also applied when data is recorded in the groove GV. Therefore, the number of wobbles of a groove for one turn of track will be larger as the groove goes toward the outer circumference of the optical disc.

1-2 Wobbling Method

Figure 5:
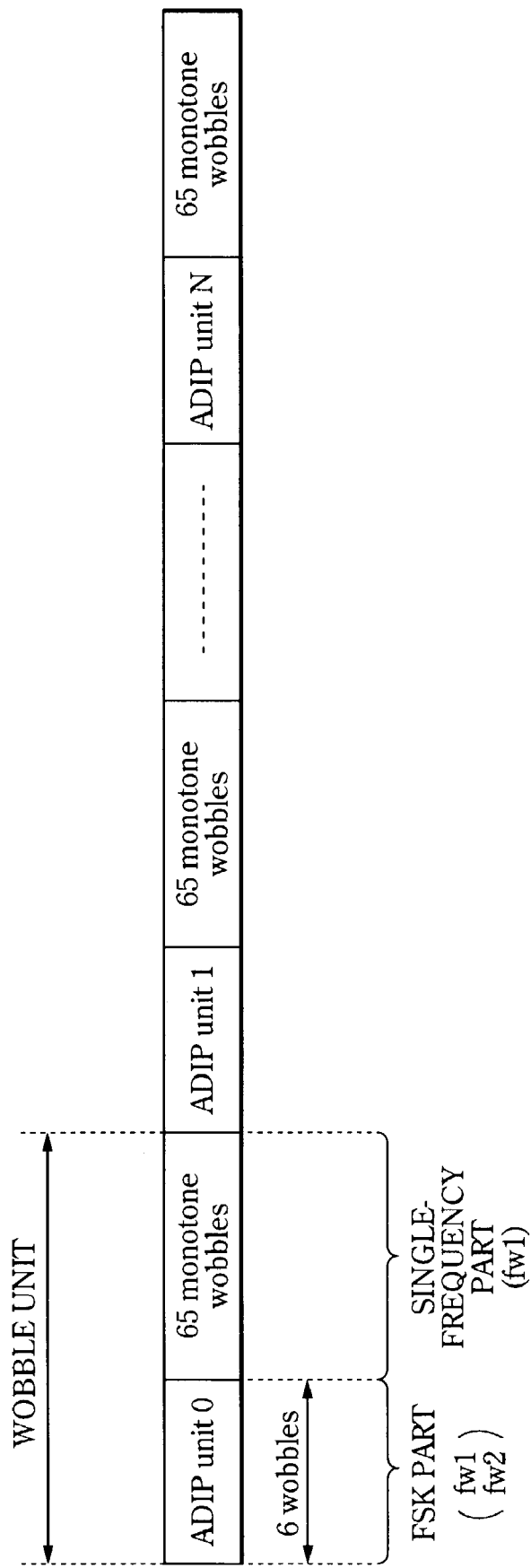
FIG. 5 explains a wobble unit on the optical disc according to the present invention.

Next, how to wobble the groove will be described:

FIG. 5 shows the structure of a wobble unit on the optical disc according to the present invention. The groove is wobbled to define a series of the wobble units shown in FIG. 5. As shown, each wobble unit is composed of an FSK information bit part and a single-frequency part. The single-frequency part includes only wobbles of a wobbling frequency fw1. For this part, the groove is wobbled in a fixed cycle corresponding to the frequency fw1. This single-frequency part provides a series of 65 wobbles of the frequency fw1 for example. It should be noted that the single-frequency wobble of the frequency fw1 is also called "monotone wobble". On the other hand, the FSK information bit part includes wobbles resulted from FSK modulation of ADIP information, made using two different frequencies, of which the one is the same as the frequency fw1 of the monotone wobble and the other is a frequency fw2 other than the monotone-wobble frequency. The time length of the FSK information bit part corresponds to a length of six monotone wobbles.

It is just an example that the single-frequency part has a period of 65 monotone wobbles while the FSK information bit part has a period of six monotone wobbles as above, and it should be noted that the single-frequency part may have a period of 60 monotone wobbles, for example. However, it is effective for a reduction of the adverse effect of crosstalk as well as for easier and quicker PLL locking for the reduction that the single-frequency part is sufficiently longer than the FSK information bit part. For example, the single-frequency part should preferably be more than about 10 times longer in period than the FSK information bit part. Therefore, in case the FSK information bit part is set to have a period of six monotone wobbles, the single-frequency part should be set to have a period of more than 60 monotone wobbles. This does not means that the single-frequency part should never be set to have a period of less than 59 monotone wobbles. Practically, however, the period of the single-frequency part should properly be set with considerations given to requirements such as permissible ranges of the crosstalk, PLL locking time, etc.

One FSK information bit part having a period of six monotone wobbles represents one information bit as ADIP data. As shown in FIG. 5, an address or the like as ADIP data is represented by information bits from ADIP units 0 to N as the FSK information bit parts discretely positioned alternately with single-frequency parts.

Because of the address structure of the ADIP data which will be described in detail later, the frequency fw1 of the monotone wobble is 478 or 957 kHz, for example. On the other hand, the other frequency fw2 used for the FSK modulation is 1.5 times higher than the frequency fw1, for example. That is, the frequency fw2 is 717 or 1435.5 kHz. However, the values of the frequencies fw1 and fw2 are not limited to the above-mentioned ones. For example, the frequency fw2 may be 1/1.5 times higher than the frequency fw1. In addition, the frequencies fw1 and fw2 should preferably be in such a relation that even and odd numbers of wobbles are made with both the frequencies in a predetermined cycle. In case the frequency fw2 is 1.5 times higher than the frequency fw1 as above, the period of six wobbles of the frequency fw1 will correspond to that of nine wobbles of the frequency fw2, which meets the above relation for the even and odd numbers of wobbles made in the predetermined cycle. If this requirement is met, the FSK demodulation can be made more easily in the disc drive which will be described in detail later.

The information bit represented by the FSK information bit part composed of the wobbles resulted from the FSK modulation of the ADIP information, effected using the two different frequencies fw1 and fw2, will be described below with reference to FIG. 6. It should be noted that in the following description, the frequencies fw1 and fw2 are it a relation of 1:1.5.

In the FSK information bit part having the period of six monotone wobbles, a period of two monotone wobbles is taken as one channel bit. Therefore, in one FSK information bit part (one ADIP unit), three channel bits form together one information bit. The FSK modulation is made so that the frequency fw1 is a channel bit "0" while the frequency fw2 is a channel bit "1". That is, in the period of two monotone wobbles of the frequency fw1, two wobbles of the frequency fw1 is "0" while three wobbles of the frequency fw2 is "1". Such three channel bits in one FSK information bit part represent information bits such as cluster sync, secondary sync, data "0" and data "1". Three channel bits being "1", "1" and "1", respectively, represent a cluster sync. In this case, nine wobbles of the frequency fw2 are included in series in a period of six monotone wobbles, as shown in FIG. 6. Three channel bits being "1", "1" and "0", respectively, represent a secondary sync. In this case, six monotone wobbles of the frequency fw2 are included in series in a period of four monotone wobbles, and a period of two monotone wobbles, following the period of four monotone wobbles, includes two wobbles of the frequency fw1. Three channel bits being "1". "0" and "0", respectively, represent data "0". In this case, a series of three wobbles of the frequency fw2 is included in a period of two monotone wobbles, and a period of four monotone wobbles, following the 2-wobble period, includes four wobbles of the frequency fw1. Three channel bits being "1", "0" and "1", respectively, represent data "1". In this case, three wobbles of the frequency fw2 are included in series in a first period of two monotone wobbles, a period of two monotone wobbles, following the first period, includes two wobbles of the frequency fw1, and a series of three wobbles of the frequency fw2 is included in the last period of two monotone wobbles.

As above, one FSK information bit part, that is, one ADIP unit as shown in FIG. 5, represents one information bit, and such ADIP information bits are gathered to form address information. Address information representing one address on the disc is of 98 bits, for example. In this case, 98 ADIP units partially laid as a wobbled groove are gathered to form address information. This will further be described later with reference to FIGS. 9 and 10.

In this embodiment, an integral multiple of wobble units each being a predetermined unit of wobbling corresponds to the time length of a data recording unit to be recorded along a track. The data recording unit is called RUB (recording unit block). One RUB includes an integer number of addresses. In the following, there will be described examples of one address in one RUB and two addresses in one RUB, respectively.

As above, the address is information included in the 98 ADIP units. In case one address is included one RUB, a section of 98 wobble units corresponds to a section where data is recorded as one RUB. In case two addresses are included in one RUB, a section of 196 wobble units corresponds to a section where data is recorded as one RUB.

First, the structure of an ECC (error correction code) block of data to be recorded will be described with reference to FIG. 7 for explanation of RUB as a unit of the to-be-recorded data.

One ECC block is also called "cluster". It is one block formed by adding an error correction code to data to be recorded. As shown in FIG. 7, the ECC block is composed of 495 rows of recording frame of 1932T (where T is a channel clock period of the data). One ECC block is of 64 kbytes. For example, the ECC block consists of data and parity as shown in FIG. 7.

The "1932T" corresponds to 28 monotone wobbles of the frequency fw1 (=957 kHz) or 14 monotone wobbles of the frequency fw1 (=478 kHz). More specifically, 69 channel clock periods T of data (with the frequency fw1 of 957 kHz), or 138 channel clock periods T of data (with the frequency fw1 of 478 kHz), correspond to one monotone wobble period of the frequency fw1. The channel clock frequency of the data is 66.033 kHz which corresponds to 957 kHz×69 or 478 kHz×138. That is, the channel clock frequency of the data is an integral multiple of the monotone wobble frequency, which means that an encoded clock for data recording can easily be generated from a wobble clock reproduced by the PLL from a monotone wobble of a wobbled groove.

Figure 7:
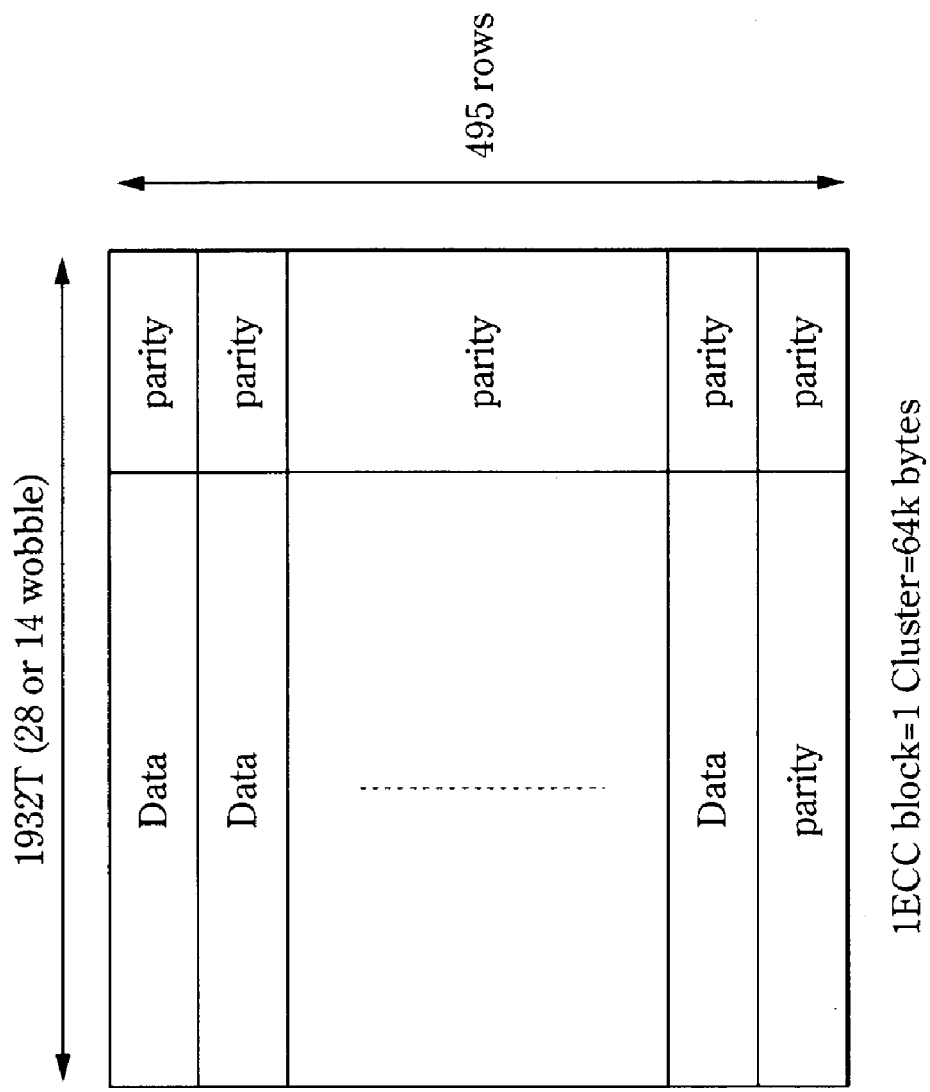
FIG. 7 explains an ECC block on the optical disc according to the present invention.
Figure 8:
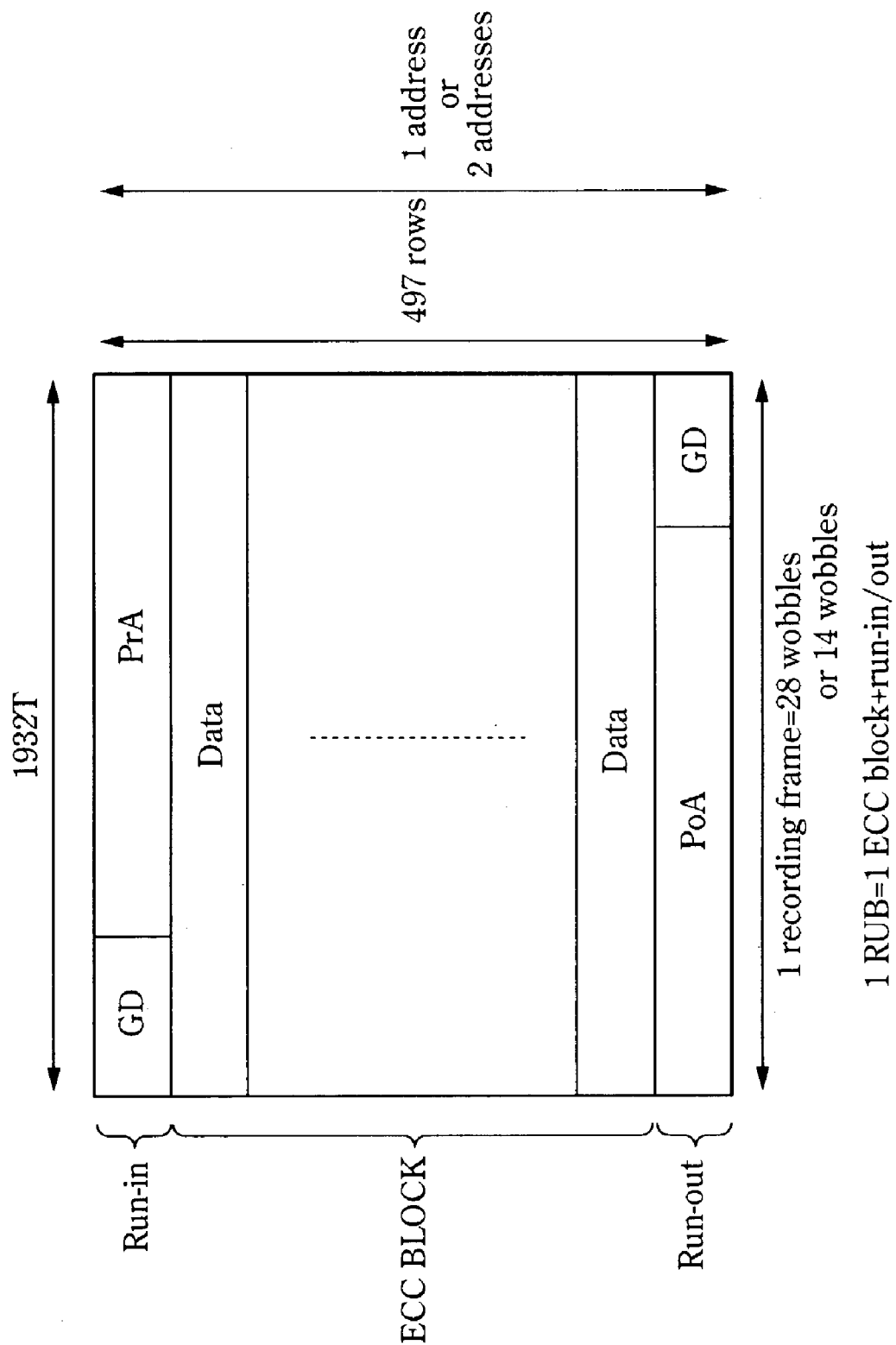
FIG. 8 explains a RUB structure.

Addition of a run-in and run-out to the ECC block shown in FIG. 7 yields a RUB (recording unit block) as shown in FIG. 8. RUB is composed of a guard GD and preamble PrA as a run-in of 1932T at the beginning of the ECC block, and a postamble PoA and guard GD as a run-out of 1932T at the end of the ECC block, as shown in FIG. 8. Therefore, the RUB is a block of 1932T×497 rows, which is a unit for data recording. One or two pieces of address information as ADIP information correspond to such a RUB. First, an example of one address corresponding to one RUB will be described with reference to FIGS. 9A and 9B and Table 2. In case one address corresponds to one RUB, the frequency fw1 of the monotone wobble is 478 kHz. The period of one wobble corresponds to 138T. In this case, since one recording frame of 1932T of RUB corresponds to a period of 14 wobbles, one RUB will correspond to a period of 14×497 (=6958) monotone wobbles as shown in FIG. 9A. In case one address corresponds to one address, the periods of 6958 monotone wobbles is taken as one address (ADIP) block.

Since an address is formed from a block of 98 bits as above, 98 wobble units will be laid in a period of 6958 monotone wobbles as shown in FIG. 9B. One wobble unit will have a length corresponding to a period of 71 monotone wobbles. That is, one wobble unit is composed of an FSK information bit part whose period is of six monotone wobbles included in an ADIP unit, and 65 monotone wobbles.

Figure 6:
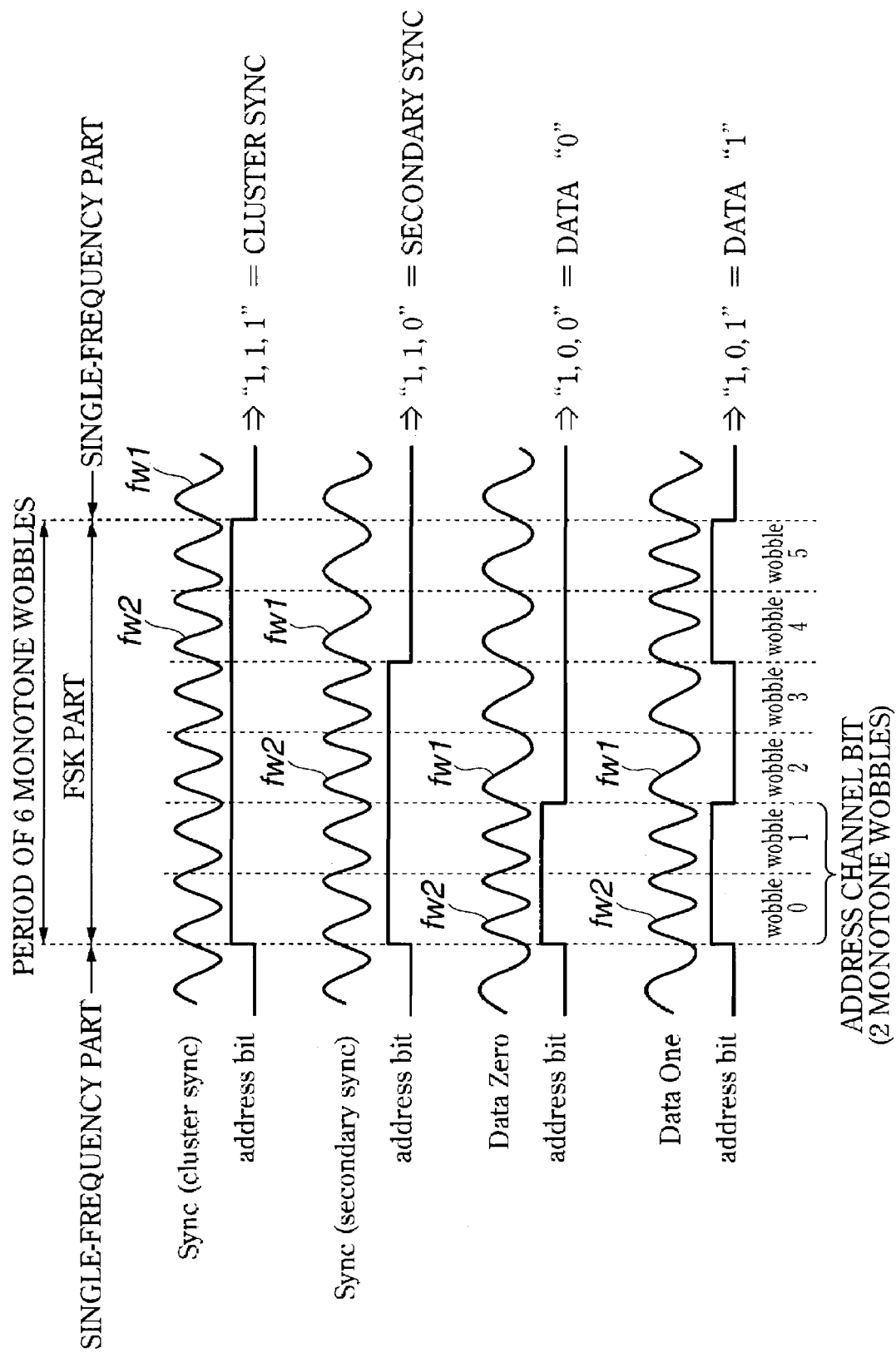
FIG. 6 explains an FSK information bit part of wobbling of the groove on the optical disc according to the present invention.

One information bit as shown in FIG. 6 is taken from each of 98 ADIP units to form address information of 98 bits. The bits included in the address information are as shown in Table 2:

TABLE 2

| Total | 98 bits | Description |
| --- | --- | --- |
| Primary sync | 1 bit | Cluster sync |
| Auxiliary bits | 9 bits | |
| Cluster address | 24 bits (3 bytes) | |
| Auxiliary data | 40 bits (5 bytes) | |
| ECC | 24 bits (3 bytes) | |

The top one bit is sync information. It corresponds to a cluster sync. The next 9 bits are auxiliary information bits. The further 24 bits (3 bytes) define a value of cluster address. The next 40 bits (5 bytes) are auxiliary information bits. The last 24 bits (3 bytes) form an ECC for the address information.

In case two addresses are included in one RUB, the address information of 98 bits is composed as shown in FIG. 10 and Table 3.

TABLE 3

| Total | 98 bits | Description |
| --- | --- | --- |
| Primary sync | 1 bit | ½ cluster sync |
| Auxiliary bits | 9 bits | |
| ½ cluster address | 24 bits (3 bytes) | 2 addresses per cluster |
| Auxiliary data | 40 bits (5 bytes) | |
| ECC | 24 bits (3 bytes) | |

In the above case, the frequency fw1 of the monotone wobble is 957 kHz. The period of one wobble corresponds to 69T. In this case, since one recording frame 1932T of RUB corresponds to a period of 28 wobbles, one RUB will correspond to a period of 13916 (=28×497) monotone wobbles as shown in FIG. 10A. In case two addresses are included in one RUB, a period of 6958 monotone wobbles, being a half period of one RUB, is one address (ADIP) block. Since an address is formed from a 98-bit block in this case as well, 98 wobble units will be included in a period of 6958 monotone wobbles, being a half period of one RUB. One wobble unit corresponds to the length of a period of 71 monotone wobbles, as shown in FIG. 10B.

Therefore, an FSK information bit part having a period of six monotone wobbles, being an ADIP unit, and 65 monotone wobbles form together one wobble unit as shown in FIGS. 9A and 9B.

One information bit is taken from each of 98 ADIP units to form address information of 98 bits. The bits included in the address information are as shown in FIG. 10. The top one bit is sync information. It corresponds to a cluster sync for a half cluster. The next 9 bits are auxiliary information bits. The further 24 bits (3 bytes) define an address value of the half cluster. The next 40 bits (5 bytes) are auxiliary information bits. The last 24 bits (3 bytes) form an ECC for the address information.

The wobbling method adopted in the present invention has been described in the above. In effect, the wobbling method in the present invention is featured as follows:

For wobbling of a track, a predetermined wobble unit is formed from an FSK information bit part corresponding to a waveform resulted from FSK modulation of information bit and a single-frequency part corresponding to the waveform of a single frequency fw1 and such wobble units are continuously connected in series. That is, the FSK information bit part having actual information bit embedded therein will partially exist on a wobbled track (groove). The partial existence of the FSK information bit part permits to considerably reduce the adverse effect of crosstalk even when the track pitch is narrow.

Two different frequencies fw1 and fw2 are used in the FSK modulation to form the FSK information bit part. The frequency fw1 is the same as the frequency of the monotone wobble, and the frequency fw2 is 1.5 times higher than the frequency fw1 for example as mentioned above. Thus, these frequencies fw1 and fw2 are in such a relation that each of them has an even number of wobbles and an odd number of wobbles alternately in a predetermined cycle.

In the FSK information bit part, a 2-wobble period of the monotone wobble is one channel bit as information bit. The period of the FSK information bit part corresponds to the period of six wobbles, namely, to a period corresponding to an integral multiple of the monotone wobble period. These features contribute to an easier FSK modulation.

In the wobble unit, the period length of the single-frequency part is more than about 10 times longer than that of the FSK information bit part. Thus, the sufficiently long period of the single-frequency part in relation to that of the FSK information bit part can facilitate the reduction of adverse effect of crosstalk.

In a relation between the wobbling and recorded data, the integral multiple of the predetermined units corresponds to a time length of RUB being a recording unit of data to be recorded on the track. An integral number of addresses, one or two, as ADIP information will be included in one RUB. These features lead to matching between the wobbled groove and data to be recorded in the groove.

The channel clock frequency of the data to be recorded to the track is an integral multiple of the single frequency fw1 of the monotone groove. Thus, an encode clock for the data recording can easily be generated by dividing the wobble clock generated based on the wobbling.

The frequency fw1 of the monotone wobble is 478 or 957 kHz for example as above. This frequency is of a frequency band between the tracking servo frequency band (near 10 kHz) and read signal frequency band (several or more MHz). This feature makes it possible to separate and extract ADIP information represented by wobbles without any interference between the servo signal and read signal.

The aforementioned FSK modulation is an MSK (minimum shift keying) as one of the FSK modulation techniques. In the FSK modulation, a modulation index H is defined and two frequencies f1 and f2 are used. The modulation index is $H=|f1-f2|/fb$ where fb is a transmission rate of a signal to be modulated. The modulation index is normally $0.5 \leq H \leq 1.0$. An FSK whose modulation index H is 0.5 is called "MSK".

According to the present invention, the two different frequencies fw1 and fw2 are continuous in phase with each other at the point of shift from one to the other in the FSK information bit part. Thus, the FSK information bit part will not have any high frequency component as in the wobbling by the PSK.

1-3 Cutting Apparatus

Next, the cutting apparatus used for producing the disc having a wobbled track formed thereon will be described.

The disc producing process generally consists of a so-called mastering process and a replicating process. The mastering process covers the steps of production down to completion of a stamper for use in the replication process, and the replication process coves the steps of productions in which the stamper is used for mass production of optical discs as the replica of the stamper.

More specifically, in the mastering process, a polished glass substrate is applied with photo resist, the photo resist layer is exposed to a laser beam to form pits and grooves in the photo resist layer (this is the so-called "cutting").

In this embodiment, pits are cut in a portion of the photo resist layer, corresponding to the embossed area at the innermost circumference side of the disc, and a wobbled groove is cut in a portion corresponding to the groove area.

Dare for the pits in the embossed area is prepared in a process called "premastering".

After completion of the cutting, the photo resist layer is subjected to predetermined processes such as development, and information is transcribed to the metallic surface by electroforming for example to form a stamper necessary to replicate the disc.

Next, the stamper is used to transcribe information to the resin substrate by the injection process for example to form a reflecting layer on the resin substrate, and then a final product is finished by making processes such as shaping of the substrate into a desired disc.

Figure 11:
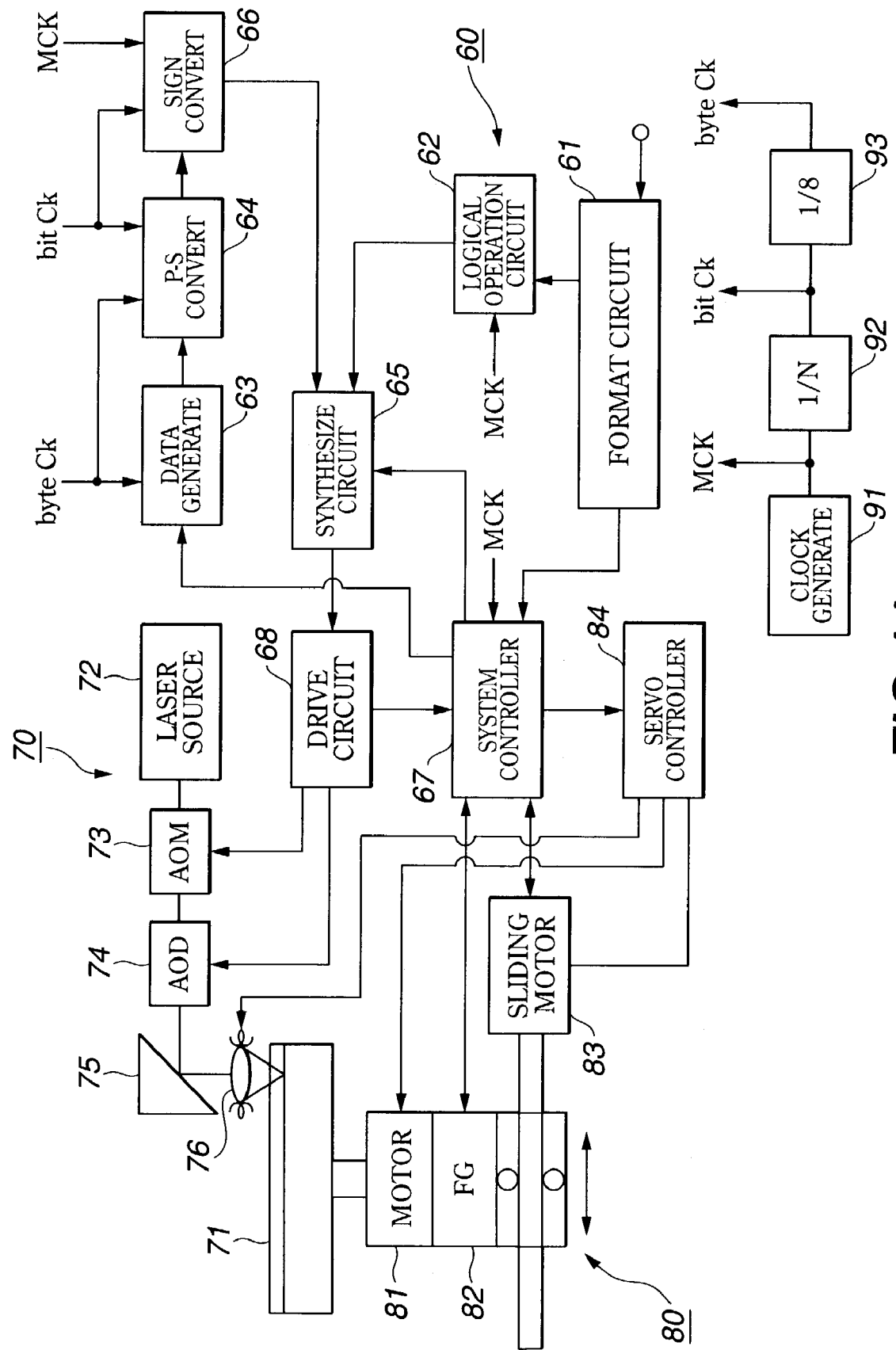
FIG. 11 is a block diagram of the cutting apparatus used for production of the optical disc according to the present invention.

Referring now to FIG. 11, the cutting apparatus according to the present invention is illustrated in the form of a block diagram. As shown, the cutting apparatus includes an optical system 70 in which a laser beam is radiated to a glass substrate 71 having a photo resist layer formed thereon to cut the photo resist layer, a drive system 80 to rotate the glass substrate 71, and a signal processor 60 to convert input data into data to be recorded and control the optical system 70 and drive system 80.

The optical system 70 includes a laser source 72 which is an He—Cd laser for example, an acousto-optical type optical modulator 73 (AOM) to modulate (on/off) the laser beam coming from the laser source 72 based on the data to be recorded, an acousto-optical type optical deflector (AOD) 74 to deflect the laser beam coming from the laser source 72 based on a wobbling signal, a prism 75 to bend the optical axis of a modulated laser beam from the optical deflector 74, and an objective lens 76 to converge the modulated laser beam reflected at the prism 75 and radiate the converged laser beam to the photo resist surface on the glass substrate 71.

The drive system 80 includes a motor 81 to rotate the glass substrate 71, an FG 82 to generate an FG pulse for detection of the rotation speed of the motor 81, a sliding motor 83 to slide the glass substrate 71 radially thereof, and a servo controller 84 to control the rotation speed of the motor 81 and sliding motor 83, tracking of th objective lens 76, etc.

The signal processor 60 includes a formatting circuit 61 to form input data by adding an error correction code or the like to source data from a computer for example, and a logical operation circuit 62 to form data to be recorded by making a predetermined processing of the input data from the formatting circuit 61. The signal processor 60 also includes a data generator 63, parallel/serial converter 64 and a sign converter 66 to generate a wobbling signal for wobbling a groove. The signal processor 60 further a synthesis circuit 65 to select one of the signal from the logical operation circuit 62 and that from the sign converter 66 and output it as one continuous signal, and a drive circuit. 68 to drive the optical modulator 73 and optical deflector 74 on the basis of the signal from the synthesis circuit 65. Further, the signal processor 60 includes a clock generator 91 to supply a master clock MCK to the logical operation circuit 62 etc., and a system controller 67 to control the servo controller 84, data generator 63, etc. on the basis of the master clock MCK supplied from the clock generator 91. The master clock MCK supplied from the clock generator 91 is divided by N in a frequency divider 92 to provide a bit clock "bit Ck". The bit clock "bit Ck" is divided by eight in a frequency divider 93 to provide a byte clock "byte Ck". The byte clock "byte CK" is supplied to a circuit system where it is required.

When cutting the photo resist layer on the glass substrate 71, the servo controller 84 in the cutting apparatus according to the present invention controls the motor 81 to rotate the glass substrate 71 at a constant linear velocity and the sliding motor 83 to slide the rotating glass substrate 71 for a spiral track to be formed with a predetermined track pitch.

At the same time, the outgoing laser beam from the laser source 72 is passed to the optical modulator 73 and optical deflector 74 where it will be modulated based on the data to be recorded, and the laser beam thus modulated is radiated from the objective lens 76 to the photo resist surface on the glass substrate 71. Thus, the photo resist is exposed based on the data and groove.

For cutting the embossed area at the innermost circumference side of the disc, the input data having the error correction code or the like added thereto by the formatting circuit 61, namely, the data to be recorded to the embossed area, such as control data, is supplied to the logical operation circuit 62 where it is formed as data to be recorded.

At the timing of cutting the embossed area, the data to be recorded is supplied to the drive circuit 68 via the synthesis circuit 65. The drive circuit 68 controls the optical modulator 73 to on-state at a time when bits are to be formed, and to off-state at a time when no bits are to be formed, according to the data to be recorded.

With the above operations, an exposed portion corresponding to an embossed pit is formed on the glass substrate 71.

At a time of cutting the groove area, the system controller 67 controls the sequential outputting of data supplied from the data generator 63 and corresponding to the FSK information bit part and singe-frequency part. For example, the data generator 63 generates a series of data "0" on the basis of the byte clock "bit Ck" for a period corresponding to the single frequency. Also, for a period corresponding to the FSK information bit part, the data generator 63 generates necessary data correspondingly to each of ADIP units forming together the aforementioned address block. That is to say, the data generator 63 generates channel bit data corresponding to a cluster sync, secondary sync, data "0" and data "1" at a time corresponding to each FSK period. Of course, the data generator 63 generates the above data "0" or "1" in such a predetermined order that data collected from the ADIP units will form a cluster address value and additional information. The data output from the data generator 63 is formed into a serial data stream corresponding to the bit clock "bit Ck" in the parallel/serial converter 64, and supplied to the sign converter 66. The sign converter 66 uses the so-called table lookup process to select a sine wave of a predetermined frequency correspondingly to the data supplied, and outputs it. Therefore, for a period corresponding to the single frequency, the sign converter 66 will continuously output sine waves of the frequency fw1. Also, for a period corresponding to the FSK information bit part, the sign converter 66 will output either a waveform of the frequency fw2 or a one of the frequencies fw1 and fw2 as shown in FIG. 6 correspondingly to the content represented by the FSK information bit part, namely, any one of the cluster sync, secondary sync, data "0" and data "1".

The synthesis circuit 65 supplies the drive circuit 68 with a signal output from the sign converter 66, that is, a signal of the single frequency or an FSK-modulated signal of the frequencies fw1 and fw2, as a wobbling signal. The drive circuit 68 will control the optical modulator 73 to on-state in order to form a groove. Also, the drive circuit 68 will drive the optical deflector 74 correspondingly to the wobbling signal. Thus, the laser beam is wobbled, namely, a portion exposed as a groove is wobbled. With the aforementioned operations, an exposed portion corresponding to a wobbled groove is formed on the glass substrate 71 according to a format. Thereafter, the glass substrate 71 is subjected to development, electroforming, etc. to produce a stamper, and the stamper is used to produce the aforementioned discs.

1-4 Disc Drive

Next, there will be described the disc drive according to the present invention to record data to the aforementioned optical disc and reproduce data recorded in the optical disc.

Figure 12:
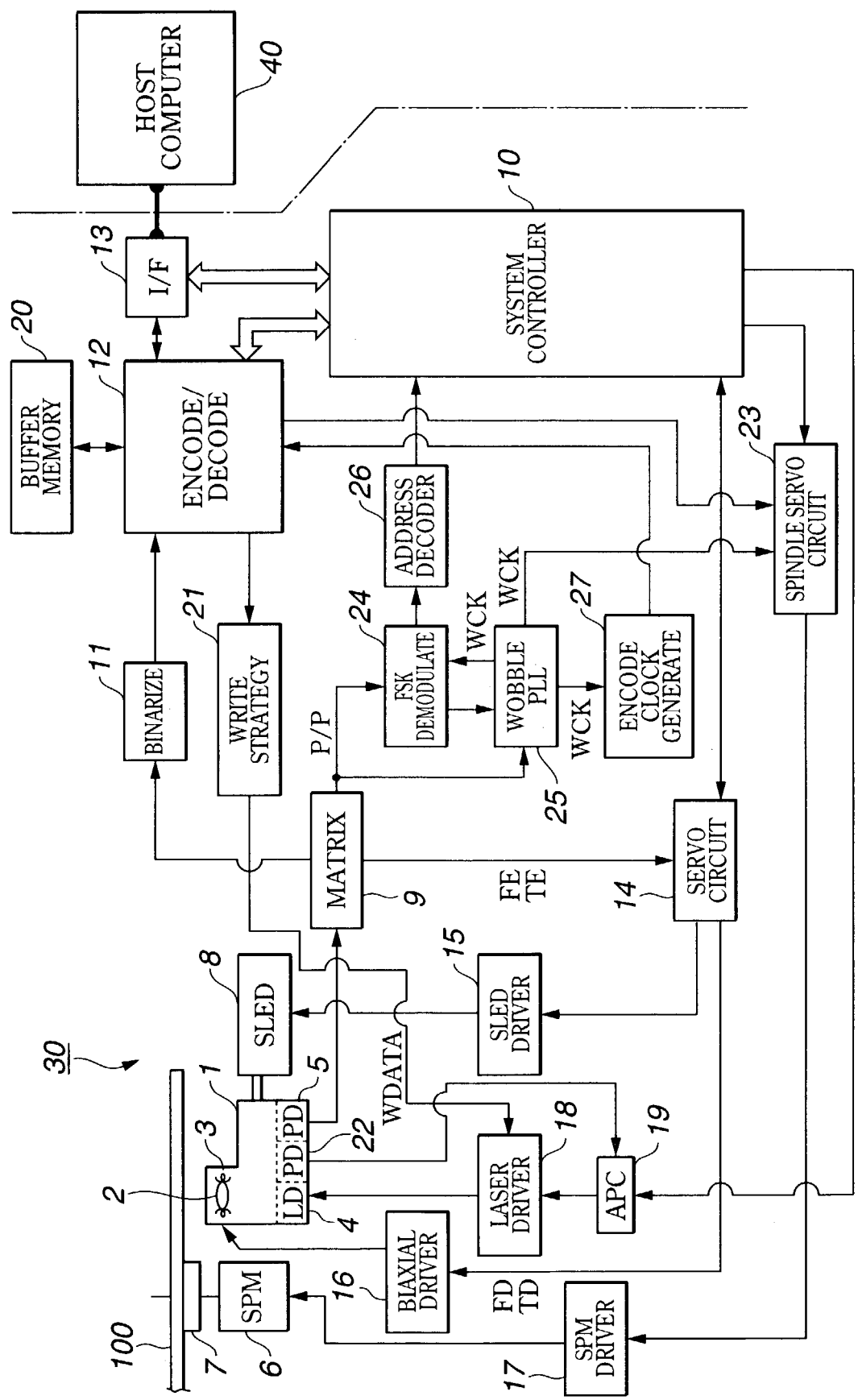
FIG. 12 is a block diagram of the disc drive according to the present invention.

Referring now to FIG. 12, the disc drive according to the present invention is schematically illustrated in the form of a block diagram. The disc drive is generally indicated with a reference 30. An optical disc 100, constructed as explained above, is used as a recording medium with the disc drive 30.

For recording or reproducing data to or from the optical disc 100, the optical disc 100 is set on a turntable 7 and rotated by a spindle motor 6 at a constant linear velocity (CLV). A signal recording area on the optical disc 100 being rotated is scanned by a laser light emitted from an optical pickup 1 to read pit data written to a track formed on the optical disc 100 and ADIP information embedded as wobbles of the track. The pits recorded as data on the track formed as a wobbled groove are so-called phase-change pits, and pits formed in the inner circumference-side embossed area are so-called embossed pits.

The optical pickup 1 has disposed therein a laser diode 4 as a laser source, a photodetector 5 to detect a return light from the optical disc 100, an objective lens 2 to converge and focus the laser light on the optical disc 100, and an optical system (not shown) to radiate the laser light to the recording layer of the optical disc 100 through the objective lens 2 and guide a return component of the laser light from the recording layer to the photodetector 5. Further the optical pickup 1 incorporates a monitoring detector 22 to detect a part of output light from the laser diode 4. The laser diode 4 emits a so-called blue laser of 405 nm in wavelength. The numerical aperture (NA) of the optical disc is 0.85.

The objective lens 2 is supported by a biaxial mechanism 3 movably in both tracking and focusing directions.

The optical pickup 1 is entirely movable by a sled mechanism 8 radially of the optical disc 100.

The laser diode 4 provided in the optical pickup 1 is driven by a drive signal from a laser driver 18 to emit the laser light.

Information carried by the return light from the optical disc 100 is detected by the photodetector 5 where it is converted into an electrical signal corresponding to the light intensity of the detected light and supplied to a matrix circuit 9 including a current-voltage conversion circuit, matrix calculation/amplification circuit, etc. to generate necessary signals by matrix calculation of current outputs from a plurality of photo acceptance units in the photodetector 5. The necessary signals include a high frequency signal (read data signal) corresponding to read data, a focus error signal FE and tracking error signal TE for use to make servo control, etc. Further, the necessary signals include a groove wobbling signal, namely, a push-pull signal P/P as a signal for detection of wobbles of a groove.

The read data signal output from the matrix circuit 9 is supplied to a binarization circuit 11, focus error signal FE and tracking error signal TE are supplied to a servo circuit (servo processor) 14, and push-pull signal P/P is supplied to a FSK demodulator 24.

The push-pull signal P/P as a groove wobbling signal from the matrix circuit 9 is processed in a wobbling circuit system composed of the FSK demodulator 24, and a wobble PLL 25 and address decoder 26. Specifically, an address is extracted from the push-pull signal P/P and a wobble clock WCK used to decode the ADIP information is supplied to other relevant circuit systems. The wobbling circuit system will be described in detail later.

The read data signal from the matrix circuit 9 is binarized in the binarization circuit 11 and then supplied to an encoder/decoder 12 which functions as a decoder during data reading and as an encoder during data writing. When reading data, the encoder/decoder 12 makes demodulation of run-length limited code, error correction, de-interleaving, etc. to provide read data.

For reading data, the encoder/decoder 12 generates, by PLL processing, a read clock synchronous with the read data signal, and decodes the data on the basis of the read clock. At each time of data reading, the encoder/decoder 12 will cumulate the data decoded as above into a buffer memory 20. As a read output from the disc drive 30, data buffered in the buffer memory 20 is read out and transferred.

An interface 13 also included in the disc drive 30 is connected to an external host computer 40 and transfers data to be recorded, read data and various commands between the disc drive 30 and host computer 40. During data reading, read data decoded and stored in the buffer memory 20 will be transferred via the interface 13 to the host computer 40. It should be noted that a read command and write command and other commands from the host computer 40 are supplied to a system controller 10 via the interface 13.

On the other hand, data to be recorded from the host computer is transferred from the host computer 40 during data writing. The data to be recorded is sent from the interface 13 to the buffer memory 20 where it will be buffered. In this case, the encoder/decoder 12 encodes the buffered data to be recorded by adding an error correction code, interleave and sub code, and encoding the data as data for write to the optical disc 100.

There is also provided an encode clock generator 27 to generate an encode clock which will be a reference clock for data encoding when data recording is made. The encoder/decoder 12 will use the encode clock for making the above encoding operations. The encode clock generator 27 generates the encode clock from the wobble clock WCK supplied from the wobble PLL 25. As mentioned above, the channel clock of the data to be recorded is of 66.033 kHz, for example, which is an integral multiple of the frequency fw1 of the monotone wobble. Since the wobble PLL 25 generates a clock of the frequency fw1 of the monotone wobble, or a clock having a frequency which is an integral multiple of the frequency fw1, as a wobble clock WCK, the encode clock generator 27 can easily generate an encode clock by dividing the frequency of the wobble clock WCK.

The data to be recorded generated through the encoding by the encoder/decoder 12 is adjusted in waveform in a write strategy 21 and then sent as a laser drive pulse (write data WDATA) to the laser driver 18. The write strategy 21 will make a recording compensation, that is, it will make a fine adjustment of optimum recording power for the recording layer characteristic, spot shape of the laser light, linear velocity of recording, etc. and also adjust the waveform of the laser drive pulse.

The laser driver 18 supplies the laser diode 4 with the laser drive pulse supplied as write data WDATA to drive the laser diode 4 for emission of laser light. Thus, a pit (phase-change pit) will be formed on the optical disc 100 correspondingly to the data to be recorded.

There is also provided an APC (auto power control) circuit 19 to control the laser driver 18 to keep a constant laser output power without being influenced by the ambient temperature or other factors while monitoring the laser output power on the basis of an output from the monitoring detector 22. The APC circuit 19 is supplied with a target value of the laser output from the system controller 10 to control the laser driver 18 to attain the target value.

The servo circuit (servo processor) 14 generates various servo drive signals from the focus error signal FE and tracking error signal TE supplied from the matrix circuit 9 in order to implement servo operations. More specifically, the servo circuit 14 generates a focus drive signal FD and tracking drive signal TD correspondingly to the focus error signal FE and tracking error signal TE, and supplies them to a biaxial driver 16. This biaxial driver 16 will drive the focus coil and tracking coil in the biaxial mechanism 3 in the optical pickup 1. Thus, the optical pickup 1, matrix circuit 9, servo processor 14, biaxial driver 16 and biaxial mechanism 3 form together a tracking servo loop and focus servo loop. Also, the servo circuit 14 turns off the tracking servo loop in response to a track jump command from the system controller 10 to provide a jump drive signal to the biaxial driver 16, thereby causing the optical pickup 1 to jump from one track to another.

The servo processor 14 generates a sled drive signal on the basis of a sled error signal as a lowpass component of the tracking error signal TE and under the access control of the system controller 10, and supplies the signal to a sled driver 15. The sled driver 15 will drive the sled mechanism 8 correspondingly to the sled drive signal supplied from the servo processor 14. The sled mechanism 8 includes a mechanism (not shown) formed from a main shaft to support the optical pickup 1, sled motor and transmission gear, etc. As the sled motor in the sled mechanism 8 is driven by the sled driver 15 correspondingly to the sled drive signal, the optical pickup 1 is sledded accordingly.

There is also provided a spindle servo circuit 23 to control the spindle motor 6 to rotate at a CLV. The spindle servo circuit 23 generates a spindle error signal SPE by acquiring the wobble clock WCK generated by the wobble PLL 25, namely, information about a current rotation speed information of the spindle motor 6, and comparing it with information about a predetermined CLV reference speed.

Since during data reading, the read clock (reference clock for decoding) generated by the wobble PLL 25 in the encoder/decoder 21 is information about the current rotation speed of the spindle motor 6, the spindle error signal SPE can also be generated by comparing the read clock with the information about the predetermined CLV reference speed.

The spindle servo circuit 23 generates a spindle drive signal corresponding to the spindle error signal SPE and supplies the signal to a spindle motor driver 17. According to the spindle drive signal supplied from the spindle servo circuit 23, the spindle motor driver 17 applies a three-phase drive signal, for example, to the spindle motor 6 to cause the latter to rotate at a CLV. The spindle servo circuit 23 also generates a spindle drive signal correspondingly to a spindle kick/brake control signal supplied from the system controller 10 to cause the spindle motor driver 17 to start, stop, accelerate or decelerate the spindle motor 6.

Operations of the above-mentioned servo system and write/read system are controlled by the system controller 10 formed from a microcomputer. The system controller 10 makes various control operations according to commands supplied from the host computer 40. For example, in case the system controller 10 is supplied with a read command for transfer of a data recorded in the optical disc 100 from the host computer 40, it will first control the seek operation for access to a given address. Namely, the system controller 10 gives a command to the servo circuit (servo processor) 14 which will thus cause the optical pickup 1 to access a target address specified by a seek command. Thereafter, the system controller 10 controls necessary operations for transfer of data in a specified data section to the host computer 40. Thus, data is read from the optical disc 100, decoded, buffered and otherwise processed and a requested data is transferred to the host computer 40.

Supplied with a write command from the host computer 40, the system controller 10 will cause the optical pickup 1 to move to an address where data is to be written. Then, the encoder/decoder 12 encodes the data transferred from the host computer 40 as mentioned above. The write data WDATA is supplied from the write strategy 21 to the laser driver 18 as above, the data recording is effected.

The disc drive 30 shown as an example in FIG. 12 is connected to the host computer 40. However, the disc drive according to the present invention is not connected to the host computer 40 as the case may be. In such a case, a control panel and display will be provided and the data input/output interface will be different in construction from that shown in FIG. 12. That is, the data recording and reproduction are to be made according to corresponding operations of the control panel by the user and there should be provided various data input/output terminals.

The disc drive according to the present invention may be constructed in many other forms, and can be constructed as a disc drive dedicated for data recording or reproduction.

Next, the wobbling circuit system included in the disc drive according to the present invention will be described.

Figure 13:
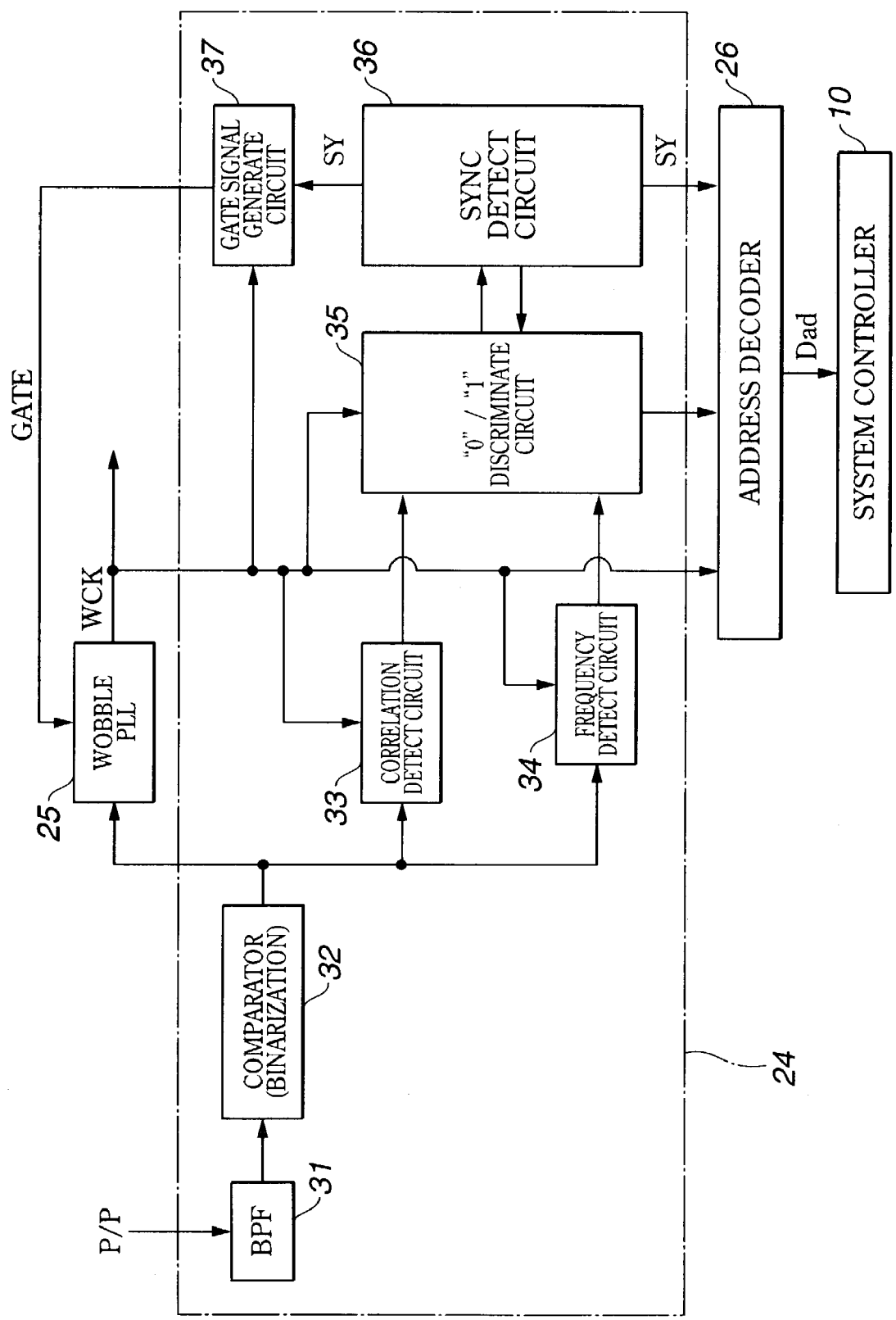
FIG. 13 is a block diagram of the wobbling circuit included in the disc drive according to the present invention.

Referring now to FIG. 13, the wobbling circuit is schematically illustrated in the form of a block diagram. FIG. 13 shows the construction of the FSK demodulator 24, wobble PLL 25 and address decoder 26 included in the wobbling circuit system. As shown, the FSK demodulator 24 includes a bandpass filter 31, comparator 32, correlation detection circuit 33, frequency detection circuit 34, discrimination circuit 35, sync detection circuit 36 and a gate signal generation circuit 37.

The push-pull signal P/P supplied as a wobbling signal from the matrix circuit 9 is supplied to the bandpass filter 31 of the FSK demodulator 24. The bandpass filter 31 has such a characteristic as passing two different frequencies, that is, the two frequencies fw1 and fw2 used in the aforementioned single-frequency part and FSK information bit part. A signal component of the frequencies fw1 or fw2 passed through the bandpass filter 31 is binarized in the comparator 32. The binarized push-pull signal P/P is supplied to the wobble PLL 25, correlation detection circuit 33 and frequency detection circuit 34. The wobble PLL 25 is designed as a PLL to make phase comparison with respect to the binarized push-pull signal P/P and generate a wobble clock WCK synchronous with the push-pull signal P/P. However, a push-pull signal P/P for a period corresponding to the FSK information bit part of the wobble unit is masked by a gate signal GATE from the gate signal generation circuit 37 which will be described in detail later, whereby a push-pull signal P/P corresponding to the monotone wobble of the single-frequency part is locked. Thus, the wobble clock WCK has the single frequency fw1 itself or a frequency having a ratio of integrals with the single frequency fw1.

Note that the single-frequency part of the aforementioned wobble unit has a period sufficiently longer, for example, more than 10 times longer, than that of the FSK information bit part. Therefore, the PLL can easily be pulled in.

The wobble PLL 25 makes phase comparison solely with the monotone wobble of the frequency fw1 on the basis of the gate signal GATE. So, the residual jitter of the wobble clock WCK generated as above is considerably reduced.

The wobble clock WCK thus generated is supplied to various circuits in the FSK demodulator 24 and also to the address decoder 26, where it will be used for FSK demodulation and decoding of the ADIP information. Also, as having been described with reference to FIG. 12, the wobble clock WCK is supplied to the end clock generator 27 and spindle servo circuit 23, where it will be used as above. In this case, since the wobble clock WCK is of a high accuracy with less residual jitter, the encode clock has an improved accuracy, the stability of recording operation is increased, and the stability of spindle servo control is also improved.

The correlation detection circuit 33 and frequency detection circuit 34 are both to demodulate channel data embedded as an FSK information bit part of the wobble unit. Therefore, at least one of these circuits 33 and 34 may be provided in the FSK demodulator 24. However, when both these correlation detection circuit 33 and frequency detection circuit 34 are provided in the FSK demodulator 24, there takes place an effect which will be described later. The correlation detection circuit 33 makes FSK demodulation by detecting a correlation over two periods of the wobble clock WCK, and demodulates the channel data. The frequency detection circuit 34 makes FSK demodulation by counting edges in one period of the wobble clock WCK, and demodulates the channel data. The constructions and operations of the correlation detection circuit 33 and frequency detection circuit 34 will be described later. From each of these circuits' 33 and 34, there are extracted channel bit data about the FSK-modulated wobble, that is, "0" and "1" as channel bits in units of a period of two monotone wobbles as shown in FIG. 4, and they are supplied to the discrimination circuit 35.

The discrimination circuit 35 ANDs or ORs channel bit values supplied from both the correlation detection circuit 33 and frequency detection circuit 34 and provides the ANDed or ORed channel bit value as a FSK-demodulated channel bit value. The discrimination circuit 35 supplies the channel bit value thus calculated to the sync detection circuit 36. The sync detection circuit 36 detects a sync on the basis of periodicity of the supplied channel bit value.

As shown in FIG. 6, the cluster sync includes channel bit values "1", "1" and "1". Also, in the FSK information bit part of three channel bits, the top channel bit is always "1", as shown in FIG. 6. On the other hand, in a period corresponding to the single-frequency part, the FSK-demodulated channel bit value is always "0". Therefore, the first "1" after a series of the channel bit values "0" will be at the top of the FSK information bit pat, and the period including such "1" will be equivalent to a period of a wobble unit. By detecting such periodicity, it is possible to know the period of each wobble unit, and when a series of three channel bits "1", "1" and "1" is detected in a wobble unit, it can be determined that the wobble unit is the top one of 98 wobble units forming together a cluster sync, that is, one ADIP information.

The sync detection circuit 36 thus detects a sync timing and supplies a sync signal SY to the gate signal generation circuit 37 and address decoder 26. The gate signal generation circuit 37 generates a gate signal GATE on the basis of the sync signal SY supplied from the sync detection circuit 36. That is, since the period of a wobble unit is known from the timing of the sync signal SY, the period of the FSK information bit part in the wobble unit can be known by counting clocks of the frequency fw1 on the basis of the sync signal SY. Thus, a gate signal GATE to mask the period of the FSK information bit part is generated to control the phase comparing operation of the wobble PLL 25.

Note that although it has been described in the foregoing that the discrimination circuit 35 ANDs or ORs the channel bit values from both the correlation detection circuit 33 and frequency detection circuit 34, the discrimination circuit 34 will AND such channel bit values for a period down to the pull-in of the wobble PLL 25 to locking, made based on the aforementioned sync detection and the gate signal GATE derived from the detected sync.

As the channel bit values supplied from both the correlation detection circuit 33 and frequency detection circuit 34 are ANDed as above, the channel bit values have improved reliability, whereby the sync can be detected with an improved accuracy and less error. On the other hand, after the PLL is pulled in based on the sync detection, the operation should be shifted from AND to OR since the sync can be guarded based on periodicity. Especially, by ORing the channel bit values supplied from both the correlation detection circuit 33 and frequency detection circuit 34, missing of the detection due to a drop-out of the channel bit value can be reduced, whereby the ADIP information can be decoded with improved reliability.

The discrimination circuit 35 acquires an FSK-demodulated channel bit value by ORing the channel bit values supplied from both the correlation detection circuit 33 and frequency detection circuit 34 after the wobble clock WCK becomes stable owing to the pull-in of the PLL, then makes discrimination between the data "0" and "1" as information bit of the FSK information bit part of each wobble unit represented by three channel bits, and supplies the information bit to the address decoder 26. The address decoder 26 can acquire address information of 98 bits having previously been explained with reference to Tables 2 and 3 by acquiring information bits with reference to the timing of the sync signal SY, thus decodes an address value Dad embedded as a wobbled groove, and supplies the address value to the system controller 10.

Figure 14:
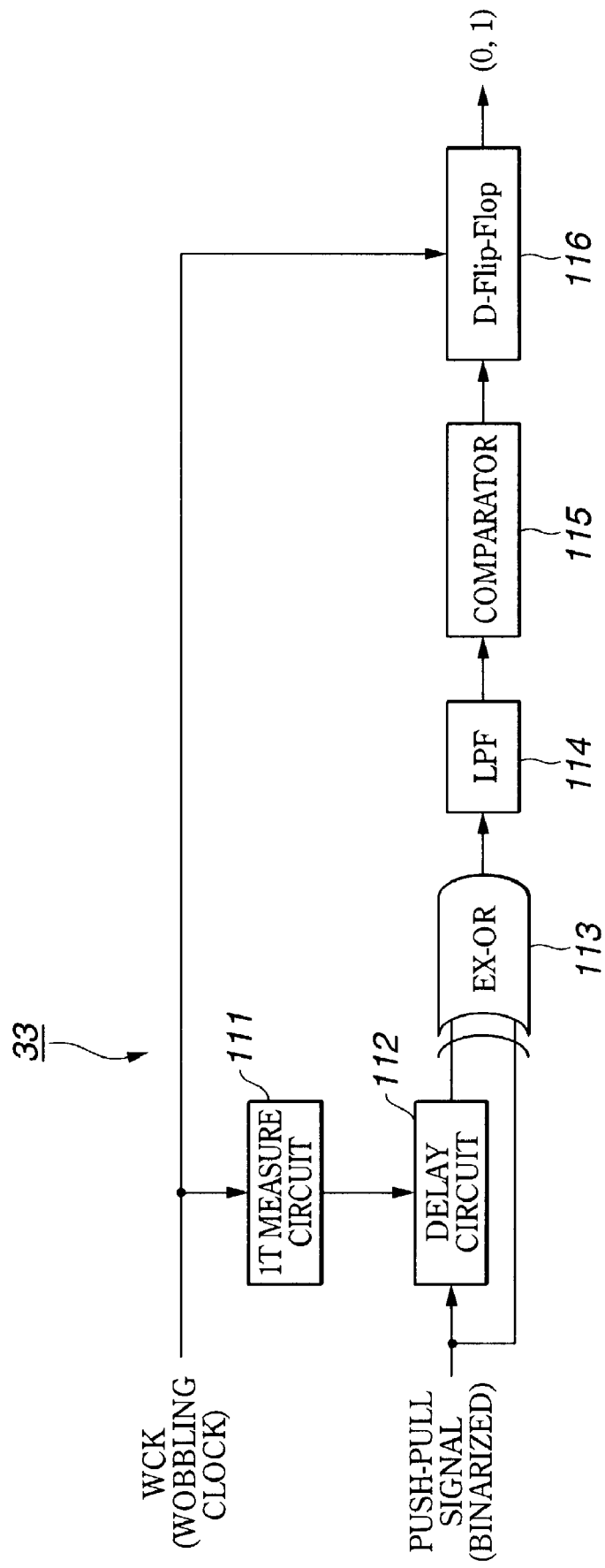
FIG. 14 is a block diagram of the correlation detection circuit included in the disc drive according to the present invention.

The correlation detection circuit 33 to make the FSK demodulation is constructed as shown in FIG. 14.

The push-pull signal having been binarized by the comparator 32 shown in FIG. 13 is supplied to a delay circuit 112 and also to one of inputs of exclusive OR (EX-OR) gate 113. The output of the delay circuit 112 is connected to the other input of the EX-OR 113.

The wobble clock WCK is supplied to a 1T measuring circuit 111. The 1T measuring circuit 111 measures one period of the wobble clock WCK and controls the delay circuit 112 to provide a delay equal to one period of the wobble clock WCK. Therefore, the EX-OR 113 makes logical operation between the push-pull signal and the push-pull signal delayed by the period of 1T. The output from the EX-OR 113 is subjected to extraction of lower frequency components in a lowpass filter 114 and binarized in a comparator 115. The binarized signal from the comparator 115 is delivered as a latched output at a D-flip-flop 116 at the timing of the wobble clock WCK. The latched output provides an output "0" or "1" as a channel bit in units of a period of two monotone wobbles, and is supplied to the discrimination circuit 35.

Figure 15:
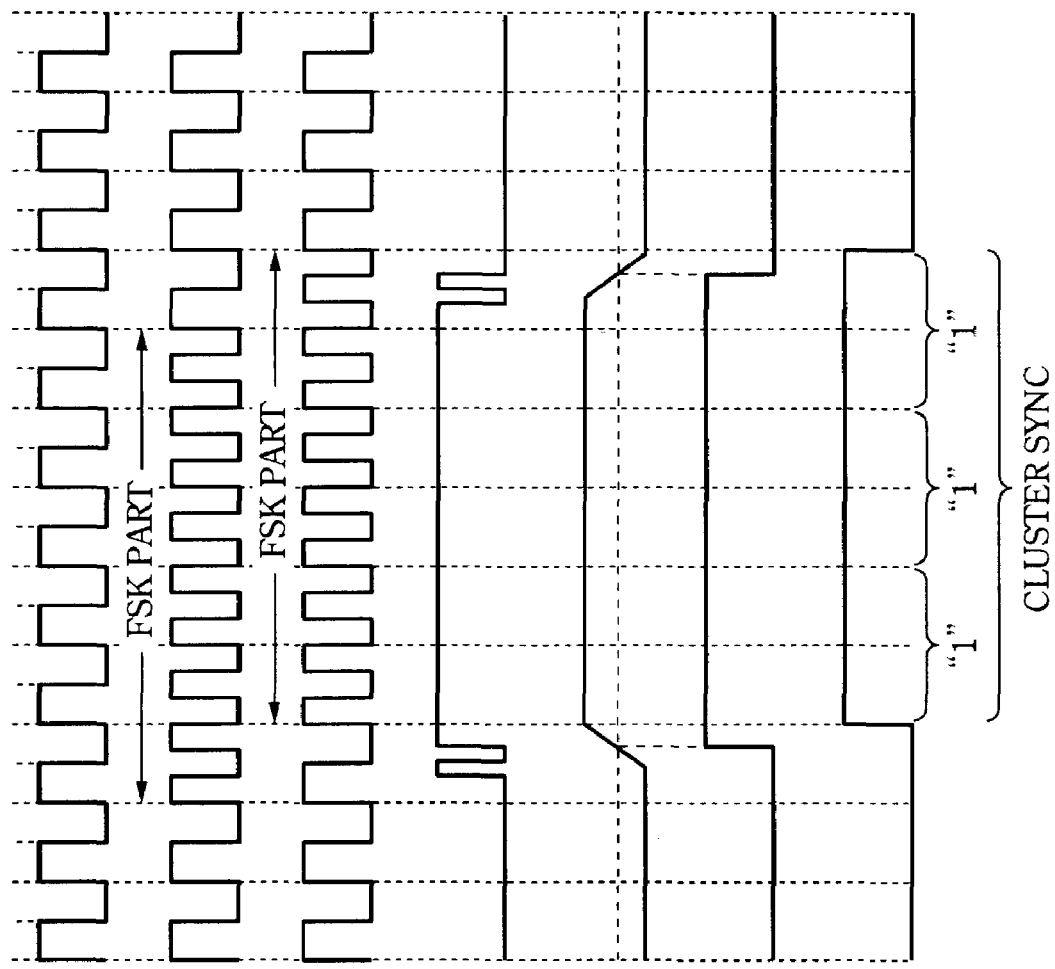
FIGS. 15A to 15G show waveforms indicating points of time at which the correlation detection circuit is actuated.

The operating waveforms of the correlation detection circuit 33 are shown in FIGS. 15A to 15G. Note that the operating waveforms include push-pull signals to be supplied for a period of the FSK information bit part as the cluster sync. That is, the period shown as the FSK information bit pat in an input push-pull signal shown in FIG. 15B is a binarized series of nine wobbles of the frequency fw2, shown as the cluster sync in FIG. 6.

FIG. 15A shows the wobble clock WCK. The EX-OR 113 is supplied with a binarized push-pull signal shown in FIG. 15B and the binarized push-pull signal, shown in FIG. 15C, which has been delayed by one wobble clock period in the delay circuit 112. Supplied with these push-pull signals, the EX-OR 113 provides an output as shown in FIG. 15D. This output is shaped by the lowpass filter 114 to have a waveform including only the lower frequency components as shown in FIG. 15E, and binarized in the comparator 115 to have a waveform as shown in FIG. 15F. This signal is supplied to the D-flip-flop 116 from which it is delivered as latched at the time of the wobble clock WCK. Thus, a signal shown in FIG. 15G will be supplied as an FSK-demodulated channel bit value to the discrimination circuit 35. The explanation is made here taking the FSK information bit part of the cluster sync as an example. So, the waveform for the period corresponding to the FSK information bit pat is "H" for a 6-wobble clock period as shown. That is, the channel bits will take values of "1", "1" and "1" in units of the 2-wobble clock period (period of two monotone wobbles). Namely, there will be provided a waveform shown as an address bit of the cluster sync in FIG. 4. If the waveform is an FSK information bit part indicating data "0" or "1", the waveform for this period will be as shown as address bits of data "0" or "1" in FIG. 4.

As having been described above, the optical disc according to the present invention uses the two different frequencies fw1 and fw2 for wobbling a track or groove. The frequency fw2 is 1.5 times higher than the frequency fw1, for example. The frequencies fw1 and fw2 are in such a relation that each of them shows an even number of waves and an odd number of waves in a predetermined cycle. In such a case, the binarized push-pull signal and the binarized push-pull signal delayed by one wobble clock period of the frequency fw1 are in opposite phase to each other for a wobble part of the frequency fw2, namely, for an FSK-modulated part corresponding to the channel bit value "1", as will be seen by comparison of FIGS. 15B and 15C. Thus, the FSK demodulation can easily be done owing to the XC-OR logic for example. It should be noted that the demodulation can of course be done by the EX-OR logic as well as any other logical operation.

Figure 16:
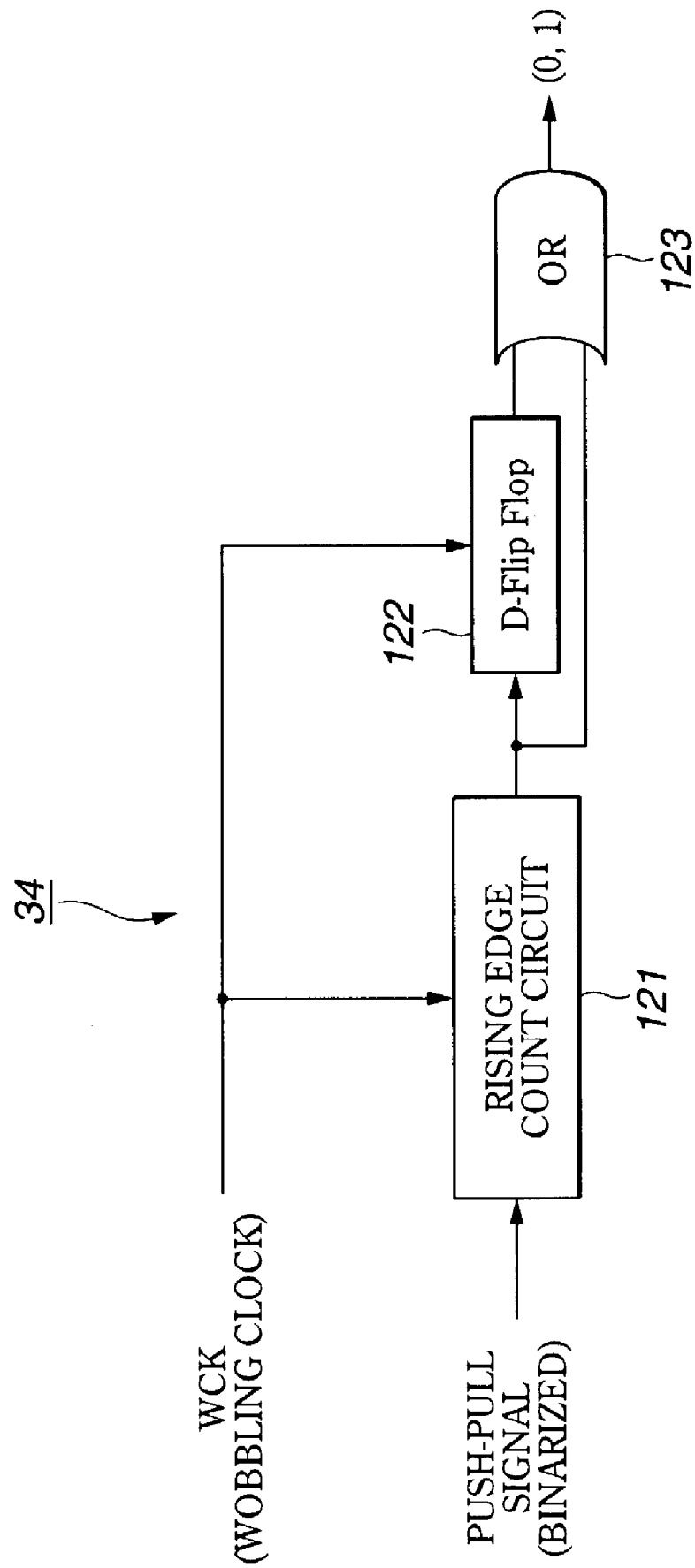
FIG. 16 is a block diagram of the frequency detection circuit included in the disc drive according to the present invention.

The frequency detection circuit 34 also included in the FSK demodulator 24 to make FSK demodulation is constructed as shown in FIG. 16.

The push-pull signal binarized in the comparator 32 shown in FIG. 13 is supplied to a rising edge count circuit 121 which counts a number of rising edges of a push-pull signal in every cycle of the wobble clock WCK. Correspondingly to the result of counting, the rising edge count circuit 121 provides an output "0" or "1". The output of the rising edge count circuit 121 is connected to one of inputs of an OR gate 123, and also to a D-flip-flop 122. The signal supplied to the D-flip-flop 122 is delayed one clock in the D-flip-flop 122 by the latch output at the time of the wobble clock WCK, and supplied to the other input of the OR gate 123. The OR output from the OR gate 123 is an output "0" or "1" as a channel bit in units of a period of two monotone wobbles, and supplied to the discrimination circuit 35.

The operating waveforms of the frequency detection circuit 34 are shown in FIGS. 17A to 17E. The operating waveforms include push-pull signals to be supplied for a period of the FSK information bit part as the cluster sync. That is, the period shown as the FSK information bit pat in an input push-pull signal shown in FIG. 17B is a binarized series of nine wobbles of the frequency fw2, shown as the cluster sync in FIG. 6.

FIG. 17A shows the wobble clock WCK. The rising edge Count circuit 121 counts a number of rising edges of a push-pull signal in every cycle of the wobble clock WCK. In FIG. 17B, each rising edge is shown with a small circle, As seen from FIGS. 17B and 17C, the rising edge count circuit 121 provides an output "0" when one rising edge has been counted within one wobble clock period while providing an output "1" when two such edges have been counted. The signal shown in FIG. 17C, thus provided as the output, and a signal shown in FIG. 17D, delayed a period 1T by the D-flip-flop 122, are ORed by the OR gate 123 to provide an output as shown in FIG. 17E. The signal thus generated is supplied as an FSK-demodulated channel bit value to the discrimination circuit 35. The explanation is made here taking the FSK information bit part of the cluster sync as an example. So, the waveform for the period corresponding to the FSK information bit pat is "H" for a 6-wobble clock period as shown. That is, the channel bits will take values of "1", "1" and "1" in units of the 2-wobble clock period (period of two monotone wobbles). Namely, there will be provided a waveform shown as an address bit of the cluster sync in FIG. 4. If the waveform is an FSK information bit part indicating data "0" or "1", the waveform for this period will be as shown as address bits of data "0" or "1" in FIG. 4.

Also, in the frequency detection circuit 34, the two different frequencies fw1 and fw2 are used for wobbling a track or groove. The frequencies fw1 and fw2 are in such a relation that each of them shows an even number of waves and an odd number of waves in a predetermined cycle. Thus, the FSK demodulation can easily be done by the very simple circuit construction as shown in FIG. 16.

Note that the above counting of rising edges may be replaced with counting of falling edges.

Second Embodiment:

2-1 Wobbling Method

Next, the second embodiment of the present invention will be described. It should be noted that the second embodiment also concerns a disc called "DVR" for example and the physical characteristics of the optical disc are similar to those having previously been described with reference to Table 1 and FIGS. 4A and 4B. The cutting apparatus for use to produce the optical disc and the disc drive for playing the optical disc are also basically similar to those having previously been described concerning the first embodiment. So, the components of the second embodiment, also used in the first embodiment, will not be described any more. Only the wobbling method and associated demodulating method, different from those in the first embodiment, will be described herebelow. In the explanation of the demodulating method, there will also be described an example of the construction of a demodulation circuit used in the disc drive included in the second embodiment and corresponding to the FSK demodulator 24 shown in FIG. 12.

FIGS. 18A to 18F show the waveforms of wobbles which are when there are used an MSK (minimum key shifting) modulation also included in the aforementioned FSK modulation method for modulating an address of a wobbled groove and a wobble detection window of L=4 for demodulation of the address. It should be noted that "L" indicates the length of the wobble detection window and "L=4" means that the detection unit corresponds to a period of four monotone wobbles. When data waveform (channel bit) as address information to be recorded to a wobbled groove is the waveform (data) in FIG. 18D, the data is pre-encoded to provide pre-code data as shown in FIG. 18E. For example, the data is pre-encoded so that the pre-code data is set "1" at the time of logical inversion of the data. The MSK modulation is done using the pre-coded data to form a stream as an MSK modulation signal as shown in FIG. 18F.

According to the second embodiment, two different frequencies fw1 and fw2 are used for the MSK modulation. The frequency fw1 is the same as a carrier frequency for the MSK modulation as shown in FIG. 18C. The frequency fw2 is 1.5 times higher than the frequency fw1 (it has a wavelength equal to ⅔ of that of the frequency fw1), for example. As shown in FIG. 18A for example, 1.5 wobbles of the frequency fw2 1.5 times higher than the carrier frequency correspond to a pre-code data "1", while one wobble of the frequency fw1 the same as the carrier frequency corresponds to a pre-code data "0" as shown in FIG. 18B. A period of 1.5 wobbles of the frequency fw2 corresponds to a period of one wobble of the frequency fw1 (=carrier frequency).

Figure 19A:
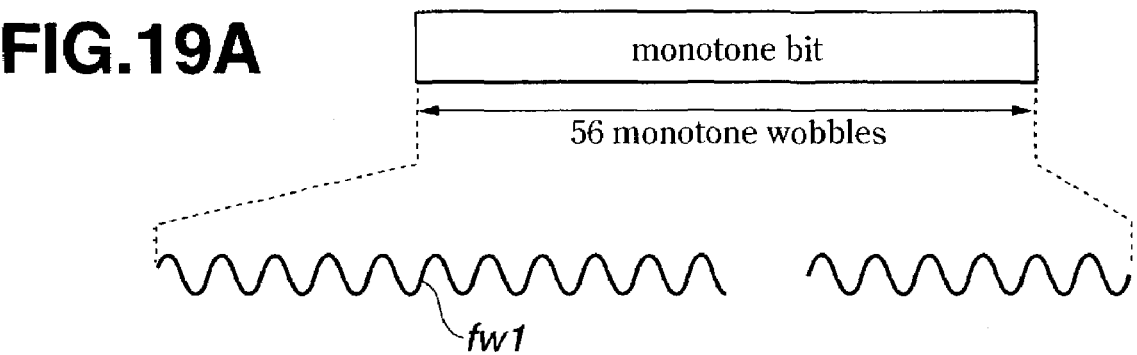
FIGS. 19A to 19C explain a bit stricture by wobbles on the second embodiment of the optical disc according to the present invention.
Figure 19B:
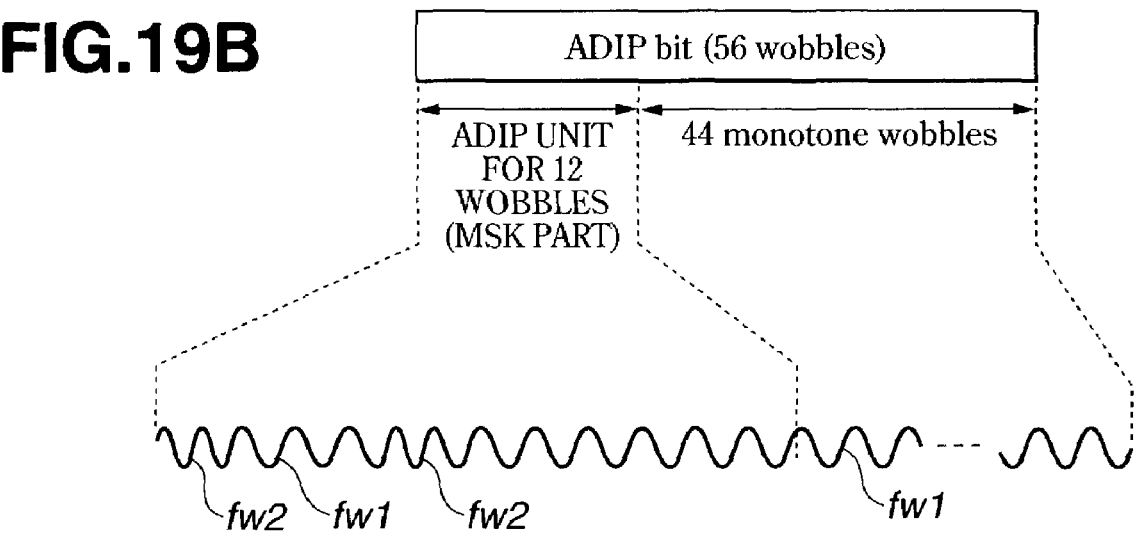
Figure 19C:
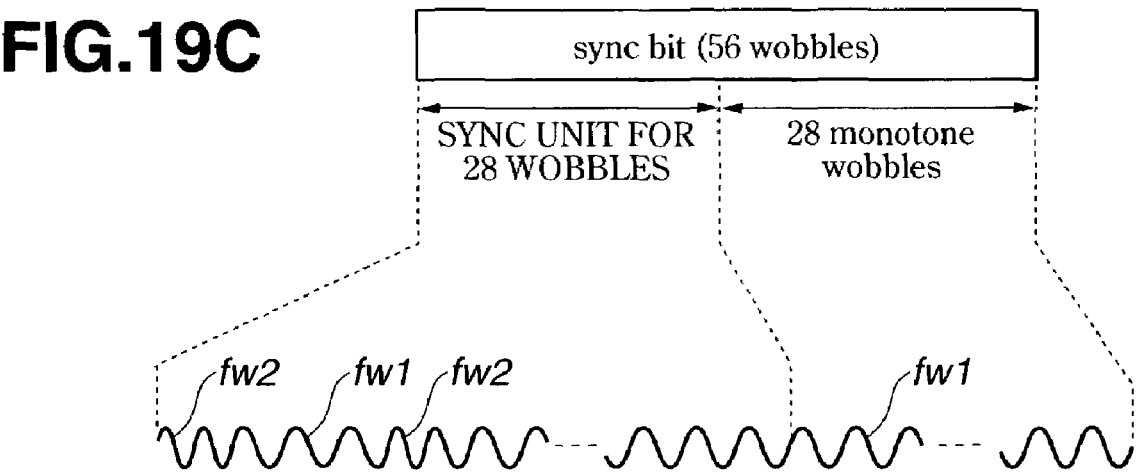

FIGS. 19A to 19C show streams each of a wobble waveform including an MSK-modulated part. FIG. 19A shows a monotone bit which is a series of wobbles of a single frequency (which is the frequency fw1). The monotone bit includes 56 monotone wobbles. FIG. 19B shows an ADIP bit has also a period of 56 monotone wobbles. The ADIP unit being of 12 of the 56 monotone wobbles is an MSK information bit part. That is, the MSK information bit part is the pre-code data MSK-modulated with the frequencies fw1 and fw2. The MSK information bit part includes address information. The other 44 monotone wobbles in the ADIP bit are a series of 44 wobbles of the single frequency (=frequency fw1). FIG. 19C shows a sync bit having also a period of 56 monotone wobbles, of which 28 monotone wobbles form together a sync unit. The pre-code data is MSK-modulated with the frequencies fw1 and fw2 as above. Sync information is represented by the pattern of the sync unit. The other 28 monotone wobbles in the sync bit are a series of 28 wobbles of the single frequency fw1 (=carrier frequency). The ADIP bit, monotone bit and sync bit correspond to one bit which will form an address block (of 83 bits) being one piece of address information (ADIP) and which will be described below.

Figures 20A, 20B:
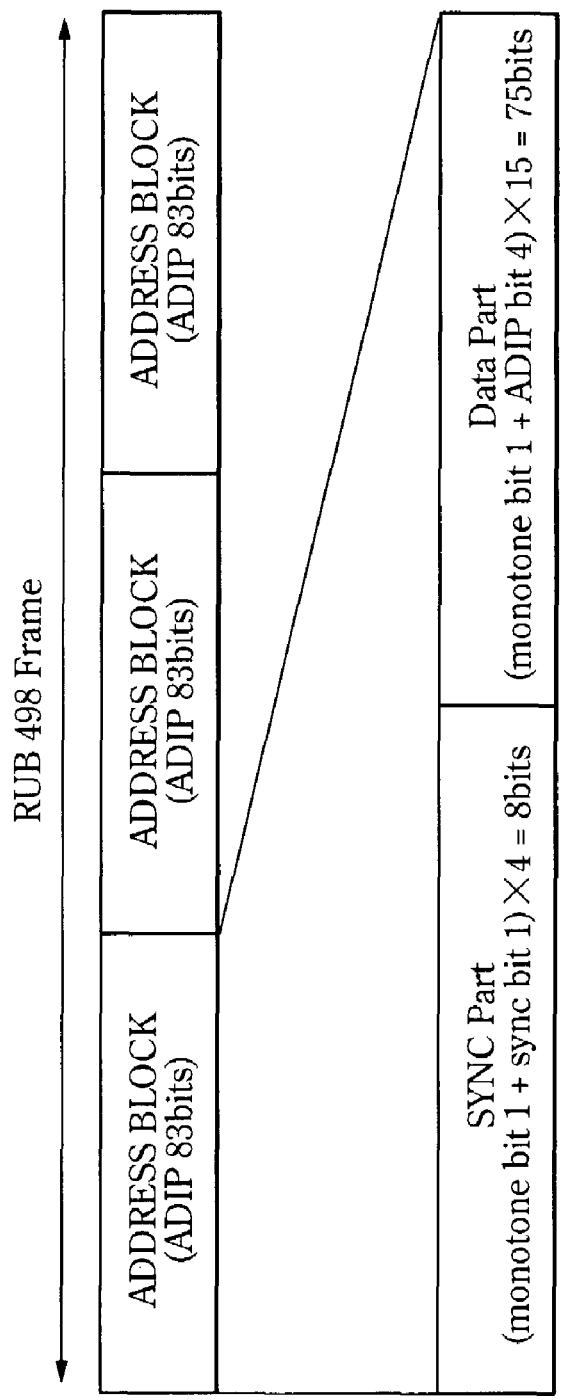
FIGS. 20A and 20B explain an address block for the RUB on the second embodiment of the optical disc according to the present invention.

According to the second embodiment, one RUB (recording unit block) being a unit of data recording includes three ADIP addresses, as shown in FIGS. 20A and 20B. As having previously been described with reference to FIGS. 7 and 8, "RUB" is a data unit consisting of one ECC block having a run-in and run-out added thereto. In this case, one RUB includes 498 frames (498 rows). As shown in FIG. 20A, a section corresponding to one RUB includes three ADIP address blocks. One address block is composed of 83 bits as ADIP data. As shown in FIG. 19, since the ADIP bit and monotone bit correspond to a period of 56 monotone wobbles, one address block corresponds to a period of 4648 (=83×56) monotone wobbles. The monotone bit, sync bit and ADIP bit are as having previously been described with reference to FIG. 19. The sync bit and ADIP bit are formed to have MSK-modulated waveform wobbles.

FIG. 20B shows the structure of one address block. The address block of 83 bits includes a sync signal part of eight bits and a data part of 75 bits. The sync signal part of eight bits includes four sync blocks each of one monotone bit and one sync bit. The data part of 75 bits includes 15 units each of one monotone bit and four ADIP bits. The monotone bit, sync bit and ADIP bit referred to herein have previously been described with reference to FIG. 19. The sync bit and ADIP bit provide a wobble having an MSK-modulated waveform.

First, the structure of the sync signal part will be described with reference to FIGS. 21A and 21B.

Figures 21A, 21B:
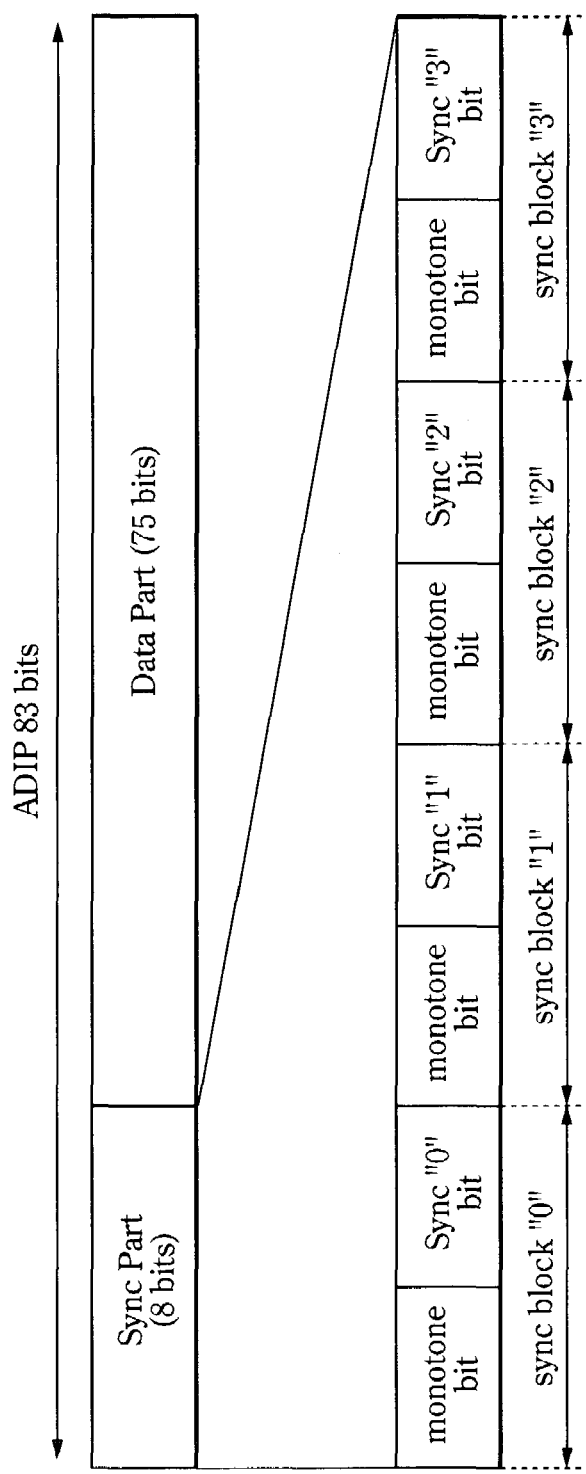

As shown in FIGS. 21A and 21B, the sync signal part is formed from four sync blocks "0", "1", "2" and "3". Of the four sync blocks, the one "0" is formed from one monotone bit and sync "0". The sync block "1" is formed from one monotone bit and sync "1", the sync block "2" is formed from one monotone bit and sync "2", and the sync block "3" is formed from one monotone bit and sync "3".

In each sync block, the monotone bit is a waveform of 56 wobbles of the single frequency representing a carrier as previously mentioned, as shown in FIG. 22A.

The sync bits include the four types: sync bits "0" to "3" as above. Each of these four types of sync bits provides a wobble pattern as shown in FIGS. 22A, 22B, 22C and 22D. Each sync bit is composed of a sync unit having a period of 28 monotone wobbles, and 28 monotone wobbles. The sync units are different in pattern from each other. FIGS. 22B, 22C, 22D and 22E show a wobble waveform pattern in a sync unit and a data pattern as address information corresponding to the wobble pattern. As shown in FIGS. 18D and 18F, one channel bit as the channel information corresponds to a period of four monotone wobbles. A channel bit stream as the address information is pre-encoded into a pre-code data as shown in FIG. 18E to provide an MSK-modulated wobble waveform pattern.

First, the sync bit "0" forms a channel bit data stream "1010000" in the sync unit as shown in FIG. 22B. Namely, it provides wobbles corresponding to a pre-code data stream "10001000100010000000000000000". More specifically, the sync bit "0" provides an MSK-modulated wobble pattern that a part of the pre-code data corresponding to "1" is 1.5 wobbles of the frequency fw2 while a part corresponding to "0" is one wobble of the frequency fw1.

The sync bit "1" forms a channel bit data stream "1001000" in the sync unit as shown in FIG. 22C, and provides a wobble waveform corresponding to a pre-code data stream "10001000000010001000000000000".

The sync bit "2" forms a channel bit data stream "1000100" in the sync unit as shown in FIG. 22D, and provides a wobble waveform corresponding to a pre-code data stream "10001000000000000100010000000".

The sync bit "3" forms a channel bit data stream "1000010" in the sync unit as shown in FIG. 22E, and provides a wobble waveform corresponding to a pre-code data stream "10001000000000000000010001000".

The tour patterns of the sync bits are laid in each sync block. Thus, when the disc drive can detect any of the four patterns of sync units in the sync signal part, a synchronism can be attained between the sync units.

Next, the structure of the data part of the address block will be described with reference to FIGS. 23A and 23B.

Figures 23A, 23B:
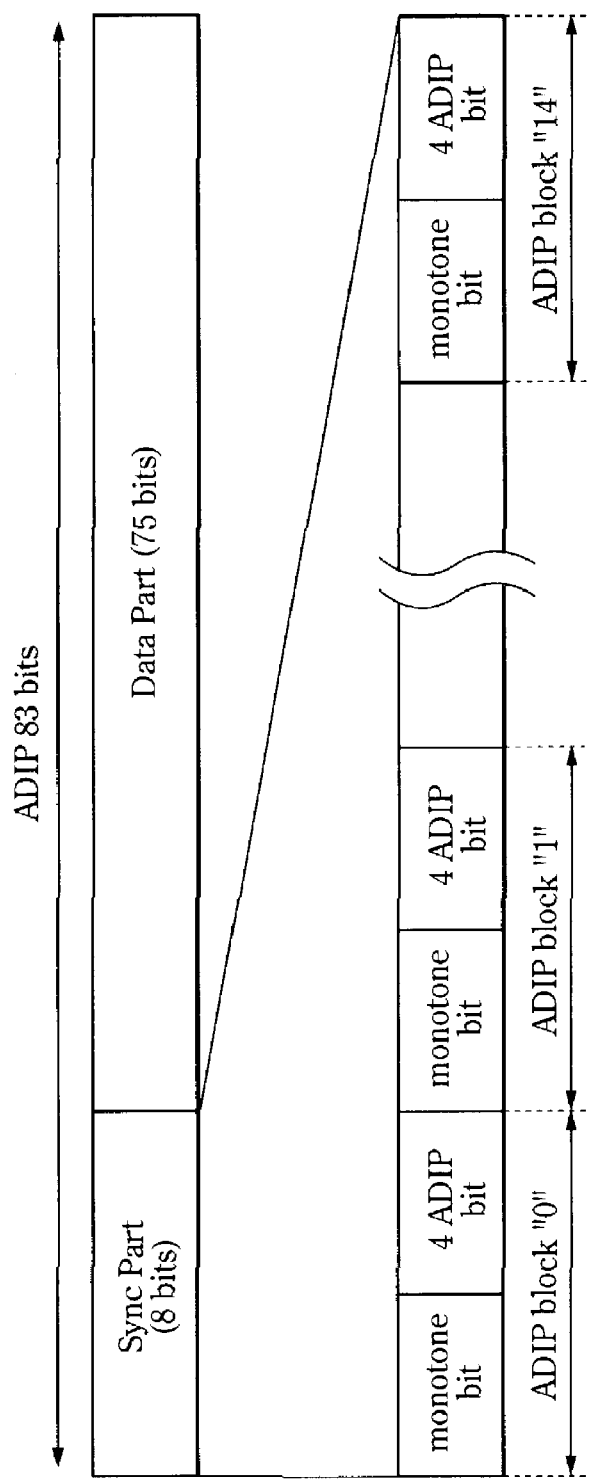
FIGS. 23A and 23B explain a data part on the second embodiment of the optical disc according to the present invention.

As shown in FIGS. 23A and 23B, the data part is formed from 15 ADIP blocks "0" to "14". Each of the ADIP blocks is of 5 bits. The five bits of each ADIP block include one monotone bit and four ADIP bits. Similarly to the sync block, the monotone bit in each ADIP block provides a waveform of a series of 56 wobbles of the single frequency representing the carrier, as shown in FIG. 24A. Since one ADIP block includes four ADIP bits, fifteen ADIP blocks form together address information of 60 ADIP bits. One ADIP block is composed of an ADIP unit having a period of 12 monotone wobbles, and 44 monotone wobbles. FIG. 24B show a wobble waveform pattern with the ADIP bit having a value "1", and a data patten as address information corresponding to the wobble waveform. FIG. 24C shows a wobble waveform pattern with the ADIP bit having a value "0", and a data pattern as address information corresponding to the wobble waveform. Each of the ADIP bits "0" and "1" is represented by three channel bits in a period of 12 monotone wobbles. One channel bit is a period of four monotone wobbles. The ADIP bit "1" forms a channel bit data stream "100" in the ADIP unit as shown in FIG. 24B. Namely, it provides a wobble waveform corresponding to a pre-code data stream "100010000000". More specifically, the ADIP bit "1" provides such an MSK-modulated wobble pattern that a part of the pre-code data corresponding to "1" is 1.5 wobbles of the frequency fw2 while a part corresponding to "0" is one wobble of the frequency fw1. As shown in FIG. 24C. The ADIP bit "0" forms a channel bit data stream "010" in the ADIP unit, namely, it provides a wobble waveform corresponding to a pre-code data stream "000010001000".

The above wobbling method according to the present invention is characterized as follows:

Wobbling is a sequence of ADIP bit and sync bit having waveforms, respectively, derived from MSK modulation of the information bit, and a monotone bit providing the single-frequency part based on the waveform of the single frequency fw1 (carrier frequency). Namely, the MSK-modulated parts in which the actual information bit is embedded will discretely be laid on a wobble track (groove). The discrete presence of the MSK-modulated parts contributes to a considerable reduction of adverse affect of crosstalk even with a narrow track pitch. The MSK modulation uses the two different frequencies fw1 and fw2. Of these different frequencies, the frequency fw1 is the same as the frequency of the monotone wobble (carrier frequency). The frequency fw2 is a frequency 1.5 times higher than the frequency fw1, for example, whereby the relation between the frequencies fw1 and fw2 is such that the numbers of both the frequencies are alternately even and odd in a predetermined cycle.

In the MSK information bit part, the period of four monotone wobbles is one channel bit (in case it corresponds to the length (L=4) of the wobble detection window) forming the information bit. The period length of the MSK-modulated part of the ADIP bit is a period of 12 monotone wobbles, that is, a period being an integral multiple of the cycle of the monotone wobble. These features will facilitate the FSK demodulation. In the disc drive which will be described later, the MSK demodulation can be easier because the demodulation is done in units of a period of a plurality of wobbles, for example, a period of four monotone wobbles. The relation between the wobbling and data to be recorded is such that an integral number (three, for example) of addresses as ADIP information are used per RUB to provide matching between the wobbled groove and data to be recorded. In the MSK information bit part, the phases are continuous at the point of shifting between the frequencies fw1 and fw2. Thus, the wobbling by the MSK modulation will not include any high frequency component as in the wobbling by the PSK modulation.

2-2 Demodulation

The demodulation corresponding to the wobbling method in the second embodiment of the present invention will be described herebelow. It should be noted that the disc drive is similar in construction to that shown in FIG. 12 and circuit components provided instead of the bandpass filter 31, comparator 32, correlation detection circuit 33 and frequency detection circuit 34 in the FSK demodulator 24 in FIG. 13 will be described with reference to FIG. 25.

Figure 25:
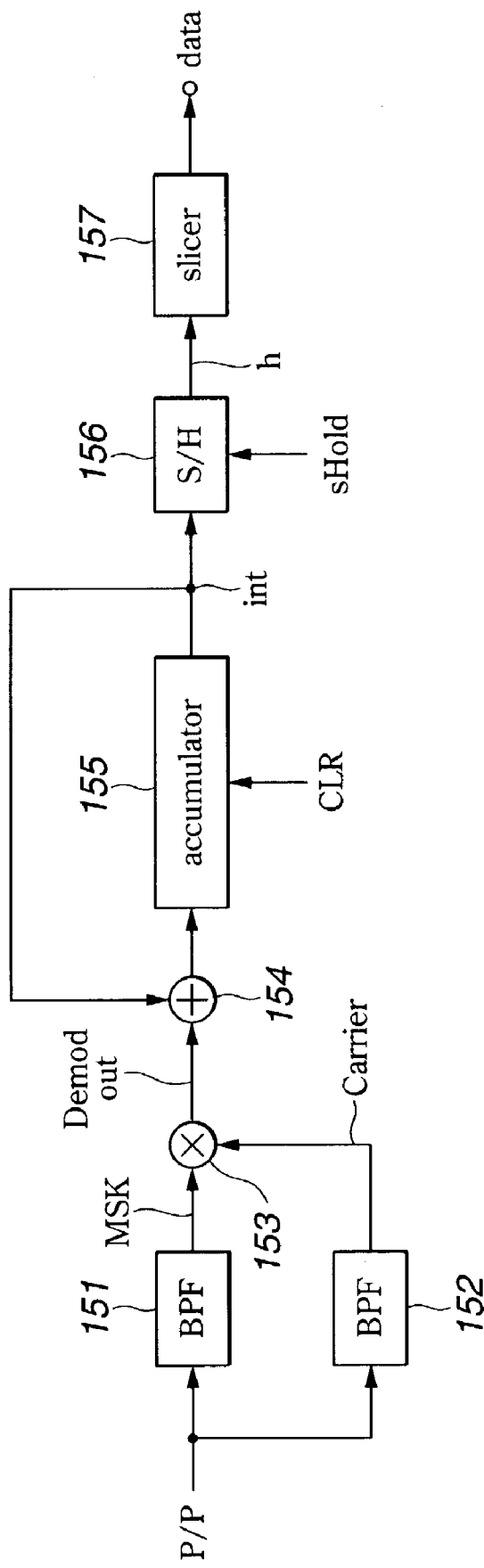
FIG. 25 is a block diagram of the MSK demodulator used for the second embodiment of the optical disc according to the present invention.

For the MSK demodulation, there are provided bandpass filters 151 and 152, multiplier 153, adder 154, accumulator 155, sample and hold circuit 156 and a slicer 157 as shown in FIG. 25. It should be noted that the components such as wobble PLL 25, address decoder 26 and encode clock generator 27, etc. included in the second embodiment are similar to those shown in FIG. 12 and so will not be described any more. The output from the circuit shown in FIG. 25 (output from the slicer 157) is supplied to the discrimination circuit 35 included in the FSK demodulator 24 shown in FIG. 13. Namely, it is assumed that the discrimination circuit 35, sync detection circuit 36 and gate signal generation circuit 37 shown in FIG. 13 are similarly provided downstream of the circuit shown in FIG. 25.

A push-pull signal P/P supplied as a wobbling signal from the matrix circuit 9 in FIG. 12 is supplied to each of the bandpass filters 151 and 152 in FIG. 25. The bandpass filter 151 has such a characteristic as to allow frequency bands corresponding to the frequencies fw1 and fw2 to pass through it. The bandpass filter 151 extracts a wobble component, that is, MSK-modulated wave. On the other hand, the bandpass filter 152 has such a narrow-band characteristic as to pass only the frequency fw1, that is, a carrier component, and thus it extracts the carrier component. The adder 153 multiplies outputs from the bandpass filters 151 and 152. The product from the adder 153 and an output from the accumulator 155 are supplied to the adder 154. The accumulator 155 is cleared by a clear signal CLR in units of a period of four wobbles (in case L=4) or a period of two wobbles (in case L=2). Therefore, the accumulator 155 will provide an integrated value for the period of four or two wobbles.

The output from the accumulator 155 is held in the sample and hold circuit 156. The sample and hole circuit 156 samples and holds the signal at the timing of a hold control signal sHOLD. The output from the sample and hold circuit 156 is binarized by the slicer 157 formed as a comparator. The binarized data output is a channel bit data forming address information, and supplied to a downstream circuit, namely, to the discrimination circuit 35 as shown in FIG. 13. In the discrimination circuit 35, the data is discriminated to have a value as an ADIP bit or sync bit. The ADIP bit thus discriminated is supplied to the address decoder 26 shown in FIGS. 12 and 13 where it will have the ADIP address thereof decoded. The sync bit will be processed in the sync detection circuit 32 in FIG. 12 in the same manner as described with reference to FIG. 12.

The MSK demodulation will be described with reference to waveforms shown in FIGS. 26A and 26B. The waveforms are ones developed when the length L of the wobble detection window is L=4.

Figure 26A:
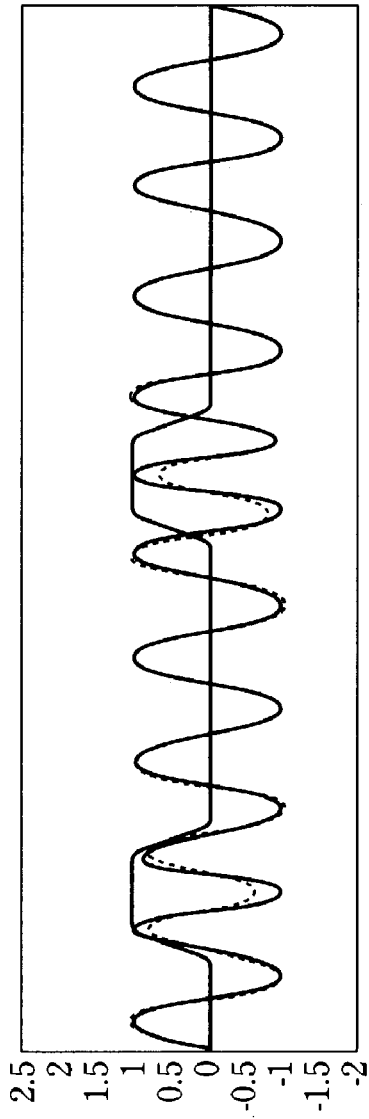
FIGS. 26A and 26B explain the MSK demodulation with the aid of waveforms observed when the length (L) of the wobble detection window is L=4.
Figure 26B:
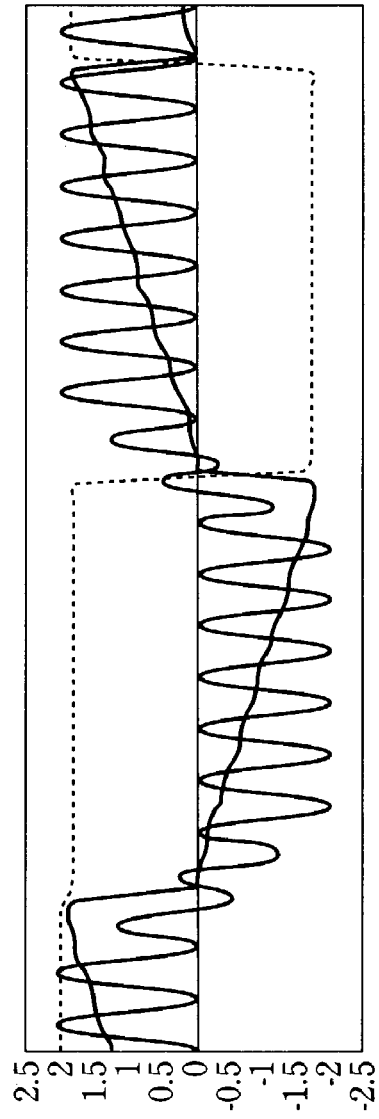

FIG. 26A shows pre-code data, a wobble waveform RISK (L=4) formed correspondingly to the pre-code data, and a carrier frequency as an output from the bandpass filter 152 (BPF out). FIG. 26B shows an output from the adder 153 (Demod out), output from the accumulator 155 (Int (L=4)) and an output from the sample and hold circuit 156 (h (L=4)). Multiplication in the multiplier 153 of the wobble waveform MSK (L=4) as shown in FIG. 26A by the carrier frequency (BPF out) provides the signal (Demod out) as shown in FIG. 26B. The accumulator 155 and adder 154 provide the signal (Int (L=4)) integrated in units of four wobbles. The integrated signal (Int (L=4)) is sampled and held in the sample and hold circuit 156 in units of four wobbles as well to provide the output (h (L=4)). The waveform of the output (h (L=4)) is binary-sliced by the slicer 157 to detect a channel bit data yet to pre-code.

Figure 27A:
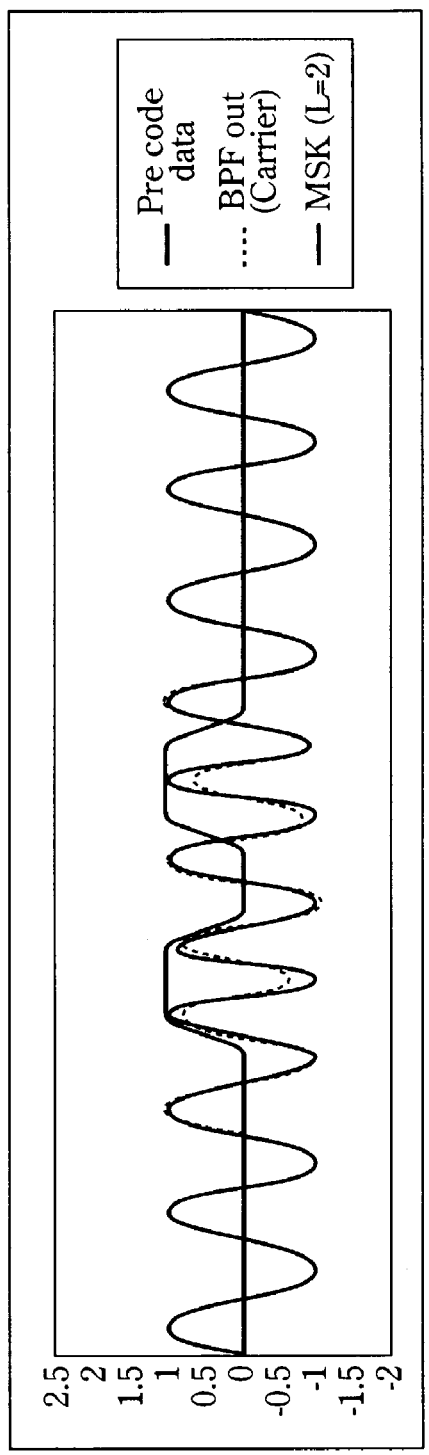
FIGS. 27A and 27B explain the MSK demodulation with the aid of waveforms observed when the length (L) of the wobble detection window is L=2.
Figure 27B:
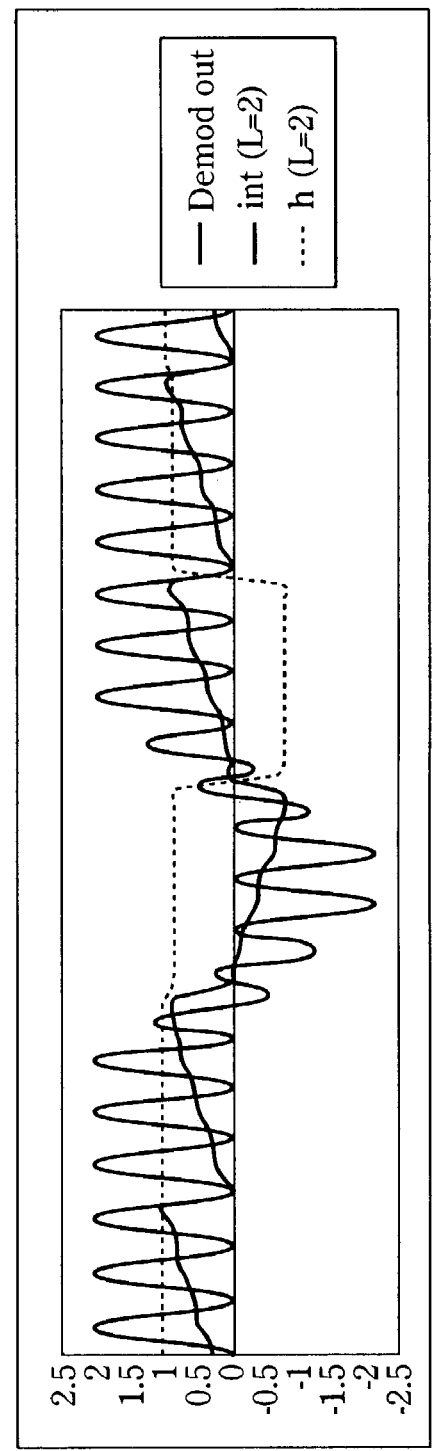

FIGS. 27A and 27B show waveforms developed when the length L of the wobble detection window is L=2. As in FIGS. 26A and 26B, pre-code data, wobble waveform MSK (L=2), carrier frequency (BPF out), output from the adder 153 (Demod out), output from the accumulator 155 (Int (L=2)) and an output from the sample and hold circuit 156 (h (L=2)) are shown in FIGS. 27A and 27B. Multiplication in the multiplier 153 of the wobble waveform MSK (L=2) by the carrier frequency (BPF out) provides the signal (Demod out) as shown in FIG. 26B. The accumulator 155 and adder 154 provide the signal (Int (L=2)) integrated in units of two wobbles. The integrated signal (Int (L=2)) is sampled and held in the sample and hold circuit 156 in units of two wobbles to provide the output (h (L=2)). The waveform of the output (h (L=2)) is binary-sliced by the slicer 157 to detect a channel bit data yet to pre-code.

According to the present invention, the length of the wobble detection window can be increased to a period of a plurality of wobbles, whereby the MSK demodulation can be done easily and accurately.

As will be seen through comparison between the integrated signal (Int) and sampled and held signal (h) shown in FIGS. 26A and 26B and FIGS. 27A and 27B, respectively, the length (L=4) of the wobble detection window will provide an integrated area 2 times larger than that provided by the length (L=2), and thus the signal will be 2 times larger. The noise when L=4 will not be 2 times larger than that when L=2 but $\sqrt{2}$ times larger.

Thus, when L=4 in total, the signal-to-noise (S/N) ratio will be better by 3 dB than with L=2. Therefore, the bit error with L=4 is smaller than that with L=2. Therefore, since the length of the wobble detection window is increased owing to the wobbling method according to the present invention, it will be understood that the MSK demodulation and ADIP decoding are more reliable.

In the foregoing, the present invention has been described concerning the embodiments of the disc, cutting apparatus for use to produce the disc and the disc drive in which the disc is used as a recording medium. However, the present invention is not limited to such embodiments but may be modified in various forms without departing from the scope of the present invention, defined by the claims given later.

INDUSTRIAL APPLICABILITY

As having been described in the foregoing, the disc-shaped recording medium according to the present invention has formed thereon wobbles each of which is a series of predetermined signal units each consisting of an FSK information bit part and a single-frequency part corresponding to the waveform of a single frequency. Since FSK-modulated (or MSK-modulated) parts are thus discretely formed, the influence of a crosstalk from adjacent wobbled tracks is reduced, which is very suitable for an improvement of the recording density with a smaller track pitch. That is, the present invention is suitably usable as the wobbling method for a large-capacity disc.

The cutting apparatus according to the present invention includes means for generating a series of predetermined signal units each composed of a signal part resulted from FSK modulation of information bit and a signal part of a single frequency. Namely, the one-beam cutting method can be adopted in the cutting apparatus for use to produce a disc-shaped recording medium intended for a larger recording capacity.

The disc drive according to the present invention is a high-performance apparatus in which information such as an address can be extracted from the wobbled groove formed on the disc-shaped recording medium. More particularly, the clock reproduction unit can easily and accurately generate, by the PLL, a wobble reproduction clock on the basis of a signal corresponding to a single frequency part of a wobbling signal, having a waveform of the single frequency. The disc drive can operate stably by generating an encode clock for processing the data to be recorded, and making spindle servo control based on the wobble reproduction clock. The PLL can operate based on a gate signal generated on the basis or the sync detection to provide a stable PLL operation only with a signal corresponding to the single-frequency part of the wobbling signal. Thus, the PLL permits a quicker pull-in to locking and a more accurate clock reproduction.

Further, the wobble formed on the disc-shaped recording medium according to the present invention includes a single-frequency part of which the length is sufficiently longer than that of the FSK information bit part. So, easy pull-in to locking of the PLL using the single-frequency part is possible. The FSK demodulation of a signal corresponding to the FSK information bit part of the wobble can be attained easily and accurately owing to the correlation detection or frequency detection.

The invention claimed is:

1. A disc-shaped recording medium comprising:
preformed thereon a spiral, wobbled track as a groove or land along which data is recorded, wherein the wobble of the track is a series of predetermined signal units each consisting of an FSK information bit part corresponding to a waveform resulted from FSK (frequency shift keying) modulation of information bit and a single-frequency part corresponding to the waveform of a single frequency,
wherein the FSK modulation is an MSK (minimum shift keying) modulation.

2. The disc-shaped recording medium as set forth in claim 1, wherein two different frequencies are used in the FSK modulation;
one of the frequencies being the same as the single frequency while the other is different from the single frequency; and
these frequencies being in such a relation that each of the frequencies has an even number of wobbles and an odd number of wobbles alternately in a predetermined cycle.

3. The disc-shaped recording medium as set forth in claim 2, wherein the other frequency has a frequency 1.5 times or 1/1.5 times higher than that of the one frequency.

4. The disc-shaped recording medium as set forth in claim 1, wherein in the FSK information bit part, a 2-wobble period of a frequency as the single frequency corresponds to one channel bit as information bit.

5. The disc-shaped recording medium as set forth in claim 1, wherein the period length of the FSK information bit part is an integral multiple of the period of the single frequency.

6. The disc-shaped recording medium as set forth in claim 1, wherein in the predetermined unit, the period length of the single-frequency part is more than 10 times of that of the FSK information bit part.

7. The disc-shaped recording medium as set forth in claim 1, wherein an integral multiple in the predetermined unit corresponds to a time length of a recording unit of data to be recorded to the track.

8. The disc-shaped recording medium as set forth in claim 1, wherein the channel clock frequency of data to be recorded to the track is an integral multiple of the single frequency.

9. The disc-shaped recording medium as set forth in claim 1, wherein a frequency as the single frequency is a one between a tracking servo frequency band and a read signal frequency band.

10. The disc-shaped recording medium as set forth in claim 1, wherein the FSK information bit part is formed on the basis of a waveform resulted from FSK modulation of information bit as address information.

11. The disc-shaped recording medium as set forth in claim 1, wherein the FSK modulation for the FSK information bit part uses two different frequencies of which the one is continuous in phase with the other at the point of shift from one to the other.

12. The disc-shaped recording medium as set forth in claim 1, wherein in the FSK information bit part resulted from MSK modulation of the information bit, a predetermined wobble period of the frequency as the single frequency corresponds to one channel bit as information bit.

13. The disc-shaped recording medium as set forth in claim 12, wherein:
the FSK information bit part resulted from MSK modulation of the information bit includes two different frequencies of which the one is the same as the single frequency and the other is a frequency x times higher than the single frequency; and
the predetermined wobble period includes a period of four wobbles of the one frequency and a period of x wobbles of the other frequency and three wobbles of the one frequency.

14. The disc-shaped recording medium as set forth in claim 13, wherein x=1.5.

15. A cutting apparatus comprising:
means for generating a series of predetermined signal units each composed of a signal part resulted from FSK modulation of information bit and a signal part of a single frequency, wherein the FSK modulation is an MSK (minimum shift keying) modulation;
means for generating a drive signal on the basis of the signal supplied from the signal generating means;
a laser source means;
means for deflecting laser light from the laser source means on the basis of the drive signal from the drive signal generating means; and
means for cutting a disc substrate by radiating the laser light to the disc substrate through the laser light deflecting means to form, on the disc substrate, a wobbled track including a series of predetermined units each composed of an FSK information bit part based on a waveform resulted from FSK modulation of the information bit and a single-frequency part based on the waveform of the single frequency.

16. A disc drive for recording or reproducing data to or from a disc-shaped recording medium having preformed thereon a spiral, wobbled track as a groove or land along which data is to be recorded and in which the wobble of the track is a series of predetermined signal units each consisting of an FSK information bit part corresponding to a waveform resulted from FSK modulation of information bit and a single-frequency part corresponding to the waveform of a single frequency, wherein the FSK modulation is an MSK (minimum shift keying) modulation, the apparatus comprising:
a head means for radiating laser light to a track to generate a return light signal;
means for extracting a wobbling signal about wobbling of the track from the return light signal; and
a wobbling information decoding means for making FSK demodulation of the wobbling signal to decode information represented by the information bit.

17. The disc drive as set forth in claim 16, wherein the wobbling information decoding means includes a clock reproduction unit to generate, by a PLL, a wobble reproduction clock on the basis of a signal corresponding to a single-frequency part of the wobbling signal, an FSK demodulator to make FSK demodulation of the wobbling signal corresponding to the FSK information bit part of the wobbling signal to provide demodulation data, and a decoder to decode required information composed of the information bit from the demodulation data supplied from the FSK demodulator.

18. The disc drive as set forth in claim 17, wherein the FSK demodulator includes a correlation detection circuit to make FSK demodulation by detecting a correlation as to the wobbling signal.

19. The disc drive as set forth in claim 18, wherein the correlation detection circuit detects a correlation between the wobbling signal and a delay signal resulted from delaying of the wobbling signal by a period of the wobble reproduction clock.

20. The disc drive as set forth in claim 17, wherein the FSK demodulator includes a frequency detection circuit to make FSK demodulation by detecting a frequency of the wobbling signal.

21. The disc drive as set forth in claim 20, wherein the frequency detection circuit detects a number of rising edges or falling edges of the wobbling signal, existent within one period of the wobble reproduction clock.

22. The disc drive as set forth in claim 17, wherein:
the FSK demodulator includes a correlation detection circuit to make FSK demodulation by detecting a correlation as to the wobbling signal and a frequency detection circuit to make FSK demodulation by detecting a frequency of the wobbling signal; and
the decoder decodes the required information using both the demodulation data demodulated by the correlation detection circuit and that demodulated by the frequency detection circuit.

23. The disc drive as set forth in claim 22, wherein the decoder decodes the required information from a logical product of the demodulated data from the correlation detection circuit and that from the frequency detection circuit when the PLL is being pulled in the clock reproduction unit, and it decodes the required information from a logical sum of the demodulated data from the correlation detection circuit and that from the frequency detection circuit when the PLL is stable in the clock reproduction unit.

24. The disc drive as set forth in claim 17, wherein:
the decoder includes a gate generator to generate a gate signal for the PLL in the clock reproduction unit based on the fact that it decodes sync information as one of the required information; and
the PLL functions on the basis of the gate signal to provide a PLL operation based solely on a part, corresponding to the single frequency, of the wobbling signal.

25. The disc drive as set forth in claim 17, further comprising a spindle servo means for making spindle servo control using the wobble reproduction clock.

26. The disc drive as set forth in claim 17, further comprising means for generating an encode clock synchronous with the wobble reproduction clock and which is to be used for encoding data to be recorded.

27. The disc drive as set forth in claim 17, wherein the wobbling information decoding means includes an MSK demodulator for making MSK modulation of an MSK modulation signal corresponding to the FSK information bit part of the wobbling signal to generate demodulation data.

28. The disc drive as set forth in claim 27, wherein the MSK demodulator demodulates the MSK modulation signal in units of a predetermined wobble period of the frequency as the single frequency to provide the modulation signal.

* * * * *

UNITED STATES PATENT AND TRADEMARK OFFICE
CERTIFICATE OF CORRECTION

PATENT NO. : 7,151,727 B2 Page 1 of 1
APPLICATION NO. : 10/275832
DATED : December 19, 2006
INVENTOR(S) : Shinichiro Iimura et al.

It is certified that error appears in the above-identified patent and that said Letters Patent is hereby corrected as shown below:

Cover page, Abstract (57) line 2, change "grove" to --groove--.
Column 5, line 1, change "f" to --of--.
Column 6, line 16, change "stricture" to --structure--.
Column 7, line 38, change "there Is used" to --there is used--.
Column 8, line 51, change "means" to --mean--.
Column 9, line 21, change "it" to --in--;
        line 44, change ""1". "0" to --"1", "0"--.
Column 12, line 63, change "coves" to --covers--.
Column 13, line 45, change "th" to --the--;
        line 58, change "circuit. 68" to --circuit 68--.
Column 14, line 35, change "singe" to --single--;
        line 37, change "bit" to --byte--.
Column 21, line 6, change "pat" to --part--;
        line 25, change "pat" to --part--.
Column 22, line 10, change "Count" to --count--;
        line 25, change "pat" to --part--.
Column 24, line 53, change "tour" to --four--.
Column 25, line 4, change "patten" to --pattern--;
        line 18, change "fwl.As shown" to --fwl, as shown--.
Column 26, line 55, change "RISK" to --MSK--.
Column 28, line 16, change "or" to --of--.

Signed and Sealed this

Third Day of July, 2007

JON W. DUDAS
*Director of the United States Patent and Trademark Office*